United States Patent
St-Pierre et al.

(10) Patent No.: US 12,498,324 B2
(45) Date of Patent: Dec. 16, 2025

(54) METHODS AND COMPOSITIONS FOR RETRIEVING CELLULAR STRUCTURES BASED ON SPATIOTEMPORAL PROFILES

(71) Applicants: Baylor College of Medicine, Houston, TX (US); William Marsh Rice University, Houston, TX (US)

(72) Inventors: François St-Pierre, Houston, TX (US); Jihwan Lee, Houston, TX (US); Zhuohe Liu, Houston, TX (US); Peter Suzuki, Houston, TX (US)

(73) Assignees: Baylor College of Medicine, Houston, TX (US); William Marsh Rice University, Houston, TX (US)

( * ) Notice: Subject to any disclaimer, the term of this patent is extended or adjusted under 35 U.S.C. 154(b) by 592 days.

(21) Appl. No.: 17/759,357

(22) PCT Filed: Jan. 25, 2021

(86) PCT No.: PCT/US2021/014924
§ 371 (c)(1),
(2) Date: Jul. 22, 2022

(87) PCT Pub. No.: WO2021/151080
PCT Pub. Date: Jul. 29, 2021

(65) Prior Publication Data
US 2023/0031708 A1 Feb. 2, 2023

Related U.S. Application Data

(60) Provisional application No. 62/965,263, filed on Jan. 24, 2020.

(51) Int. Cl.
*G01N 21/64* (2006.01)
*G01N 15/01* (2024.01)
(Continued)

(52) U.S. Cl.
CPC ..... *G01N 21/6458* (2013.01); *G01N 15/0227* (2013.01); *G01N 15/1433* (2024.01);
(Continued)

(58) Field of Classification Search
CPC .......... G01N 21/6458; G01N 15/0227; G01N 15/1433; G01N 15/1456; G01N 15/1459;
(Continued)

(56) References Cited

U.S. PATENT DOCUMENTS 11,958,976 B2 * 4/2024 Lavis ................. G01N 21/6458
2005/0109950 A1 * 5/2005 King .................... G01N 15/147
250/458.1
(Continued)

FOREIGN PATENT DOCUMENTS

WO 2010/122426 A2 10/2010

OTHER PUBLICATIONS

Osseiran, Sam, et al. "Longitudinal monitoring of cancer cell subpopulations in monolayers, 3D spheroids, and xenografts using the photoconvertible dye DiR." Scientific Reports 9.1 (2019): 5713. (Year: 2019).*

(Continued)

Primary Examiner — Dominic J Bologna
(74) Attorney, Agent, or Firm — Norton Rose Fulbright US LLP

(57) ABSTRACT

Provided herein are embodiments of methods and systems for screening cellular, subcellular, and multicellular structures. In one embodiment, a method for screening is provided comprising the steps of introducing a plurality of cellular, subcellular, or multicellular structures, or a combination thereof, to an imaging system, wherein one or more structures of the plurality comprise one or more taggable markers; imaging the plurality of structures using the imaging system; identifying one or more target structures among
(Continued)

the plurality of structures based on one or more properties of the target structures; tagging the target structures to produce tagged target structures, wherein each target structure is selectively illuminated by an excitation light, thereby causing one or more taggable markers within the target structure to be phototransformed to produce one or more phototransformed taggable markers within the target structure; and isolating one or more tagged target structures from the plurality of structures.

33 Claims, 15 Drawing Sheets

(51) Int. Cl.
| | | |
|---|---|---|
| *G01N 15/02* | (2024.01) | |
| *G01N 15/0205* | (2024.01) | |
| *G01N 15/0227* | (2024.01) | |
| *G01N 15/10* | (2024.01) | |
| *G01N 15/14* | (2024.01) | |
| *G01N 15/1433* | (2024.01) | |
| *G01N 15/149* | (2024.01) | |

(52) U.S. Cl.
CPC ..... *G01N 15/1456* (2013.01); *G01N 15/1459* (2013.01); *G01N 15/1468* (2013.01); *G01N 15/01* (2024.01); *G01N 2015/0238* (2013.01); *G01N 2015/0288* (2013.01); *G01N 2015/0294* (2013.01); *G01N 2015/1006* (2013.01); *G01N 15/149* (2024.01); *G01N 2015/1493* (2013.01); *G01N 21/6428* (2013.01)

(58) Field of Classification Search
CPC .. G01N 15/1468; G01N 15/01; G01N 15/149; G01N 21/6428; G01N 2015/0238; G01N 2015/0288; G01N 2015/0294; G01N 2015/1006; G01N 2015/1493
See application file for complete search history.

(56) References Cited

U.S. PATENT DOCUMENTS

| | | | |
|---|---|---|---|
| 2011/0065143 | A1 | 3/2011 | Ogle et al. |
| 2012/0295798 | A1 | 11/2012 | Archer et al. |
| 2013/0286181 | A1* | 10/2013 | Betzig ...................... H04N 7/18 |
| | | | 348/79 |
| 2016/0243261 | A1 | 8/2016 | Min et al. |
| 2018/0030434 | A1* | 2/2018 | Lombana ................. A61P 11/06 |
| 2023/0028605 | A1* | 1/2023 | Chouket ............ G01N 21/6408 |
| 2023/0120931 | A1* | 4/2023 | Kastrup ............... G01N 33/582 |
| | | | 436/172 |
| 2024/0060121 | A1* | 2/2024 | Moffitt ................. C12Q 1/6841 |

OTHER PUBLICATIONS

Hasle, Nicholas, et al. "Visual cell sorting: a high-throughput, microscope-based method to dissect cellular heterogeneity." BioRxiv (2019): 856476. (Year: 2019).*
International Search Report mailed Jun. 3, 2021, during examination of International Application No. PCT/US21/14924.
Hasle, et al. "Visual Cell Sorting: A high-throughput, microscope-based method to dissect cellular heterogenity", bioRxiv, 2019.
Extended European Search Report issued in corresponding European Application No. 21744186.4, dated Jan. 19, 2024.

* cited by examiner

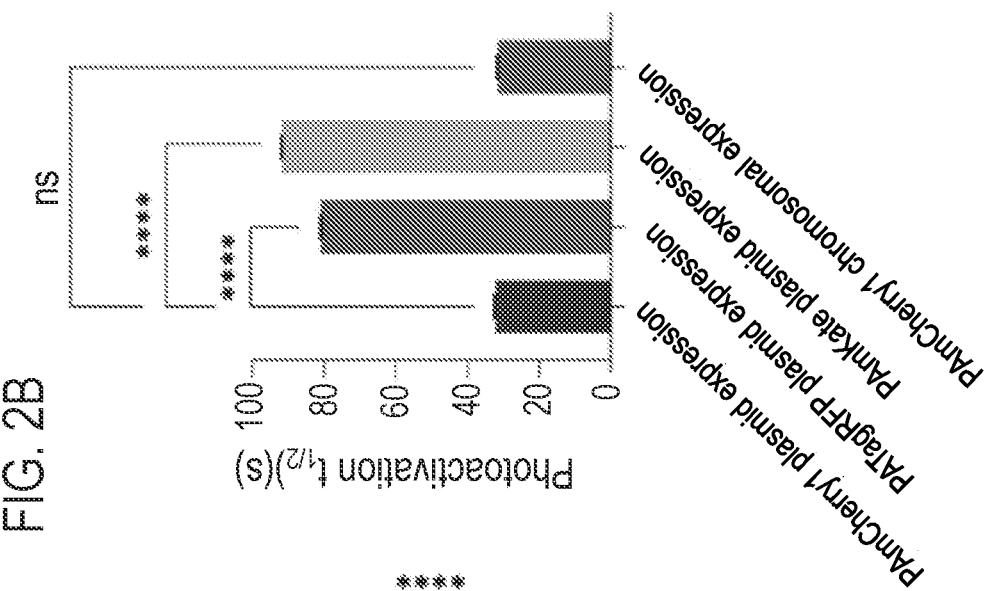
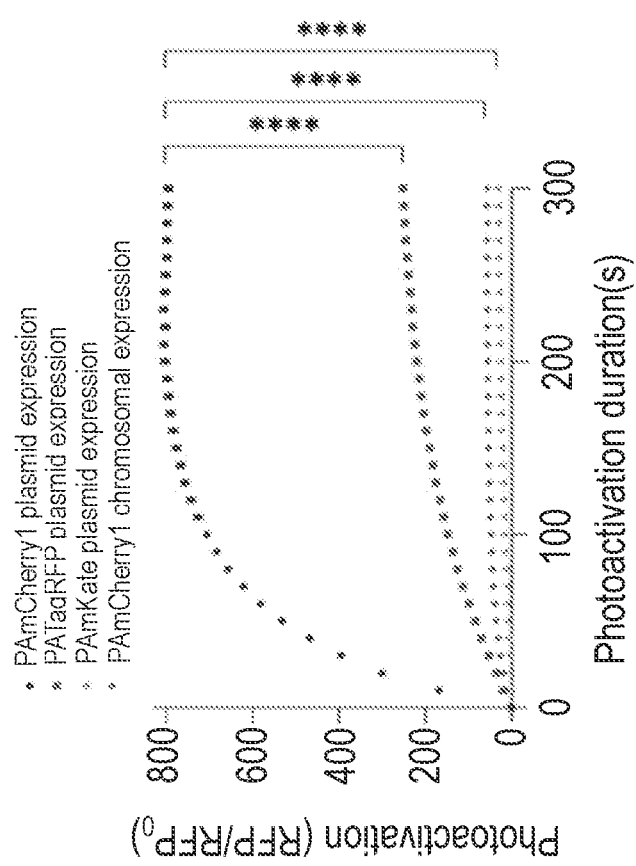

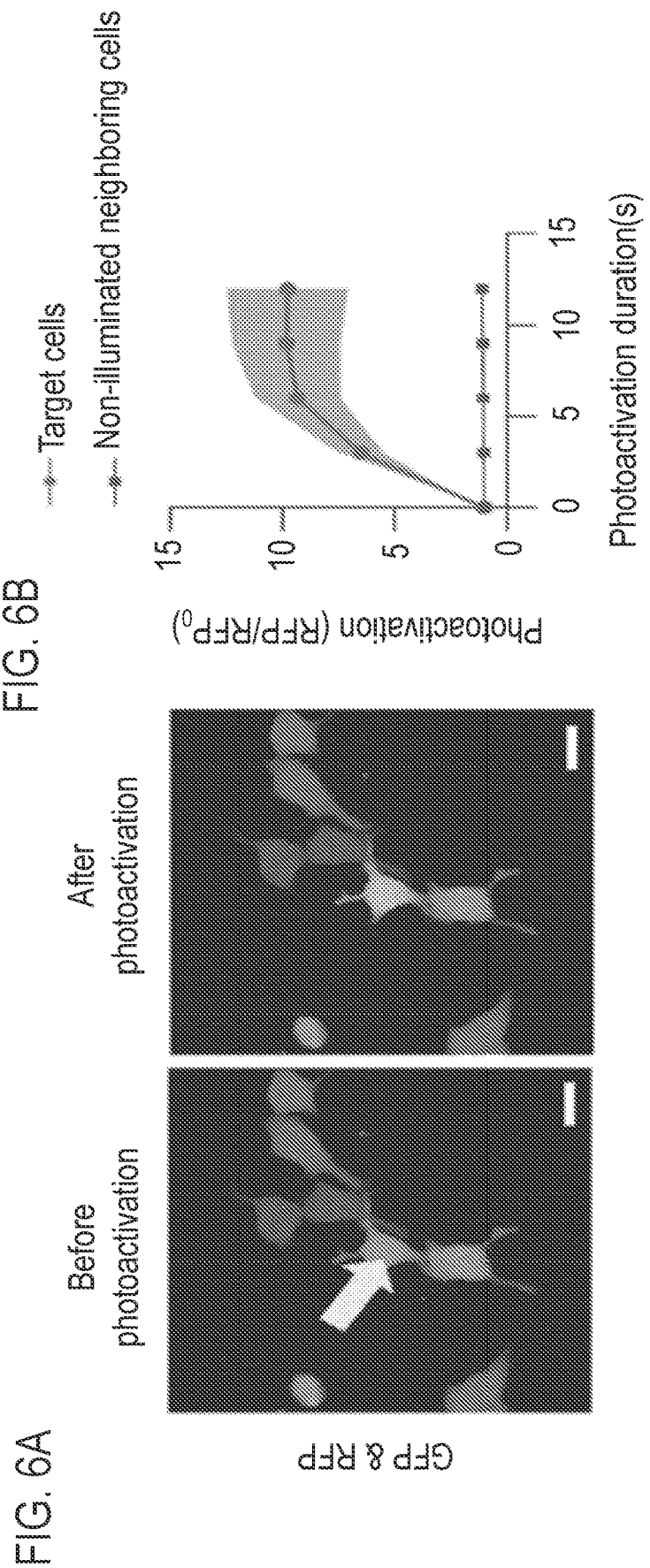

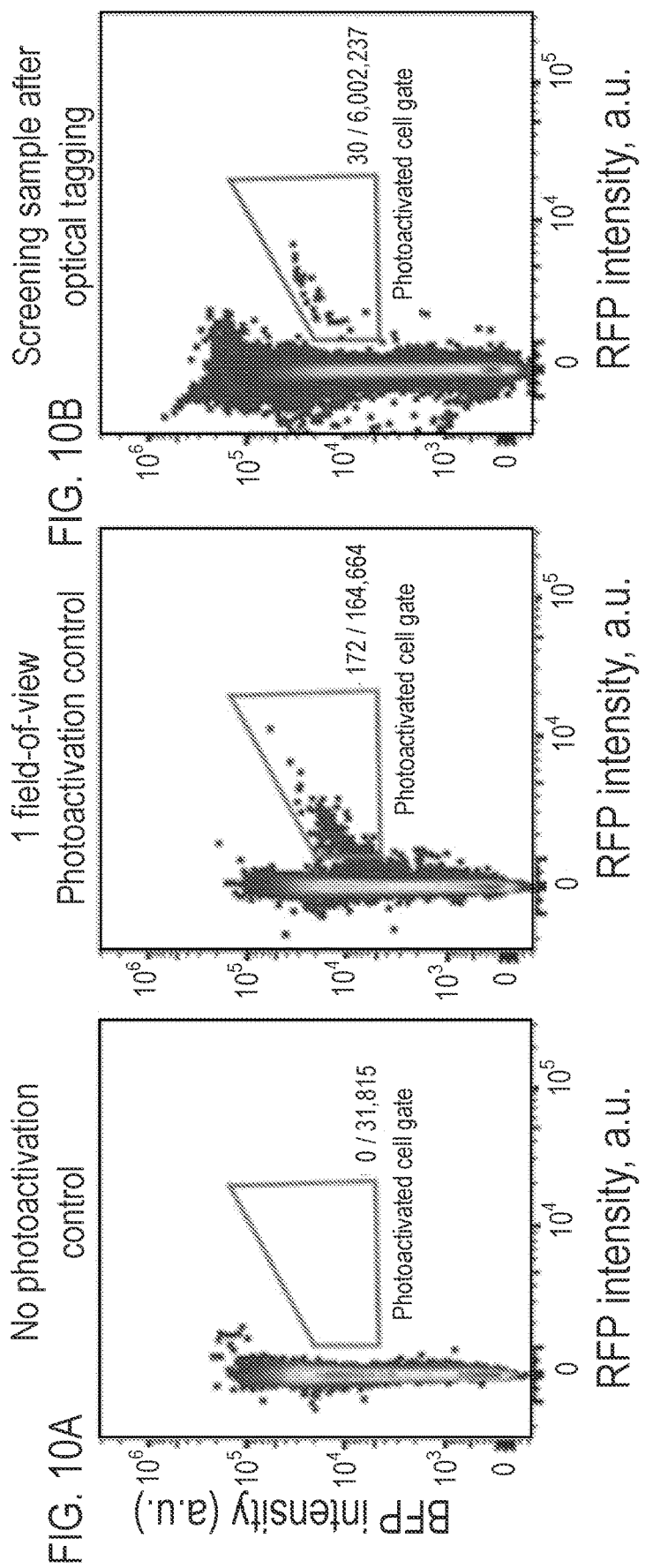

METHODS AND COMPOSITIONS FOR RETRIEVING CELLULAR STRUCTURES BASED ON SPATIOTEMPORAL PROFILES

CROSS-REFERENCE TO RELATED APPLICATIONS

This application is a national phase application under 35 U.S.C. § 371 that claims priority to International Application No. PCT/US2021/014924 filed Jan. 25, 2021, which claims priority to U.S. Provisional Patent Application Ser. No. 62/965,263, filed Jan. 24, 2020, both of which are incorporated by reference herein in their entirety.

STATEMENT REGARDING FEDERALLY SPONSORED RESEARCH OR DEVELOPMENT

This invention was made with government support under EB027145 and NS113294 awarded by the National Institutes of Health, and 1707359 and 1935265 awarded by the National Science Foundation. The government has certain rights in the invention.

TECHNICAL FIELD

Embodiments of the invention disclosure relate at least to cell biology, molecular biology, medicine, and diagnostics, including relating to methods and systems for high-throughput, high-content phenotypic screening of cellular, subcellular, and multicellular structures.

BACKGROUND

Understanding how genetic sequences determine phenotypes is critical for unraveling the rules of life and for engineering using biological substrates. A useful approach to mapping genotypes to phenotypes is to screen large collections of genetically diverse variants and analyze the sequences of variants showing phenotypes of interest. However, current screening methodologies are limited in their throughput or in their ability to monitor complex phenotypes that require spatiotemporal resolution.

Several approaches exist for screening large libraries of natural or engineered variants, but there is a trade-off between high throughput and high content. For example, Fluorescence Activated Cell Sorting (FACS) can sort at high rates but cannot conduct dynamic measurements, monitor cells with subcellular resolution, or screen cells in intact tissue. Conversely, standard microscopy-based approaches (e.g., with 96-well plates) can image with high spatiotemporal resolution, but their throughput is limited and screening in intact tissue is also not typically possible. There is therefore a need for techniques that can screen large number of cells based on dynamic properties and with subcellular resolution.

Existing microscopy-based single-cell isolation methods have limited versatility specialized for assaying and retrieving only one or a few specific cell types on a single layer. Some approaches have sought to incorporate sorting capabilities to microscopy-based imaging techniques, for example automated pipetting, laser-based extraction from microcapillaries, optical traps, and optically-controlled adhesion using a synthetic chemical. These techniques are typically specialized for sorting one (or a few) specific cell types but not others. For example, no single approach has been shown to function with bacteria, yeast, and mammalian cells. They are also optimized for screening cells isolated into chambers or plated onto monolayers and cannot be used to screen cells within biofilms, tissue, or in vivo, where cells are distributed in all three spatial dimensions. Finally, with the exception of the optically-controlled adhesion method, all require custom microfluidics or optical hardware that can be difficult and expensive to set up by standard biological labs.

BRIEF SUMMARY

Embodiments of the present disclosure are directed to methods and systems of a microscopy-based all-optical screening platform which can perform massively parallel multiparameter screens. The methods and systems of the disclosure utilize single structure observations of one or more phenotypic characteristics, optical tagging of desired cellular, subcellular, or multicellular structures, and retrieval of the tagged structures. The methods and systems of the disclosure address the high content/high throughput trade-off by combining the advantages of microscopy with the ability to retrieve individual cellular or subcellular structures within dense, mixed populations. Some embodiments of the methods and systems of the disclosure may be referred to herein as SPOTlight (Single-cell Phenotypic Observation and Tagging with light).

Embodiments of the disclosure introduce a novel and powerful approach to rapidly retrieve cellular, subcellular, or multicellular structures of interest following the high-throughput imaging of large collections of mixed cells. The systems and methods rely on selective illumination of target structures labeled with phototransformable molecules, followed by the retrieval of those target structures from the large collection of cellular, subcellular, or multicellular structures. Retrieval can be achieved with multiple types of sorting system, such as FACS or microfluidics-based sorting, where the system sorts based on the presence or absence of a phototransformed molecule. In alternative embodiments, the optical tagging of target structures may in turn activate selectable markers, such as antibiotic resistance or auxotrophy, which allows for the retrieval of the tagged target structures when cultured in an environment taking advantage of the selectable markers.

A major advantage of the systems and methods of the disclosure is that it is versatile. It can be used with any cell, including those that are not genetically tractable, those organized in a dense monolayer, or those in a three-dimensional structure such as organoids, and in combination with any microscopy technique, both in vitro and in vivo. Another critical advantage is that the systems and methods of the disclosure can be readily implemented with commercially available hardware; in specific embodiments, it can even be performed with no additional hardware using confocal microscopes. In specific embodiments, the systems and methods are amenable to different imaging modalities, such as 1-photon widefield or multi-photon laser scanning microscopy.

Embodiments of the disclosure include methods for screening cellular, subcellular, or multicellular structures, comprising the steps of: introducing a plurality of cellular, subcellular, or multicellular structures, or a combination thereof, to an imaging system, wherein one or more structures of the plurality comprise one or more taggable markers; imaging the plurality of structures using the imaging system; identifying one or more target structures among the plurality of structures based on one or more properties of the target structures; tagging the target structures to produce tagged target structures, wherein each target structure is selectively illuminated by an excitation light, thereby causing one or more taggable markers within the target structure to be phototransformed to produce one or more phototransformed taggable markers within the target structure; and isolating one or more tagged target structures from the plurality of structures using the phototransformed taggable markers. In specific embodiments, the isolation of the one or more tagged target structures is performed with a structure sorting system, such as a flow cytometer with sorting capability or a fluorescence-activated large particle sorter. In specific embodiments, one or more structures of the plurality further comprise one or more selectable markers; the one or more phototransformed taggable markers within the target structure cause the activation of one or more selectable markers within the target structure to produce one or more activated selectable markers; isolating the one or more tagged target structures is performed by culturing the plurality of structures in an environment only amenable to structures comprising the one or more activated selectable markers to produce one or more isolated tagged target structures. The one or more selectable markers may comprise an antibiotic resistance marker or an auxotrophic marker, for example. In some cases, steps a-d of any method encompassed herein is repeated one or more times prior to isolation, such as in step e. The one or more taggable markers may comprise a phototransformable protein, such as a photoactivatable protein (including one selected from the group consisting of: PA-GFP, PA-sfGFP, PAmCherry1, PATagRFP, PAmKate, and Phamret. The phototransformable protein may be a photoconvertable protein, such as one selected from the group consisting of: Kaede, Dendra2, mClavGR2, mMaple, PS-CFP2, Meos3.2, EosFP, mEosFP, mEos2, mEos3.2, mEos4a, mEos4b, tdEos, kikGR, PsmOrange, PsmOrange2, and mKikGR. In some cases, the phototransformable protein is a photoswitchable protein, such as one selected from the group consisting of: mTFP0.7, PDM1-4, Dronpa, Dronpa-2, Dronpa-3, bsDronpa, Padron, Padron0.9, Mut2Q, rsFastLime, rsKame, Dreiklang, mGeos-M, EYQ1, KFP1, rsCherry, rsCherryRev, rsTagRFP, mApple, asFP595, Kindling FP, rseGFP, and rseGFP2. In some cases, the one or more taggable markers comprise a phototransformable dye, including a photoactivatable dye. Examples of phototransformable dyes include PA-JF549, PA-JF646, DCDHF-based dyes, and BODIPY-based dyes. In some cases, the phototransformable dye is a photoconvertible dye, such as a DiR-based photoconvertible dye. In some cases, the phototransformable dye is a photoswitchable dye, such as one selected from the group consisting of: Atto 488, Cy3B, Alexa 647, Cy7, Alexa 750, and Si-Rhodamine dyes.

In particular embodiments, cellular structures, including a plurality of structures, are prokaryotic or eukaryotic cells. In specific embodiments, the plurality of structures are from an animal, from a plant, from a fungus, from a protist, from a bacteria, from a yeast, or from a mixture thereof. The plurality of structures may be from a mammal, including a human. In some cases, the human is known to have a medical condition or is suspected of having a medical condition. The one or more structures in the plurality may or may not comprise a vector, including a vector that comprises an expression construct that encodes a mutant of a wild type protein. In some cases, one or more properties of the target structures are selected from the group consisting of fluorescence, morphology, size, granularity, localization, calcium concentration, voltage, and a combination thereof.

In some cases, the method further comprises the step of: e) analyzing the one or more isolated tagged target structures. The analyzing may or may not comprise analysis of one or more DNA or RNA sequences in the one or more isolated tagged target structures. The one or more structures may comprise a vector that comprises an expression construct that encodes a mutant of a wild type protein, wherein at least part of the sequence of the mutant is determined. In some methods, they may further comprise the step of culturing the one or more isolated tagged target structures.

Embodiments of the disclosure encompass systems for screening cellular, subcellular, or multicellular structures, comprising a substrate comprising a plurality of cellular, subcellular, or multicellular structures configured such that at least the majority of the structures are not set apart as individual structures; an imaging system; and an optical tagging system. In some cases, the optical tagging system comprises one or more systems for patterning light selected from the group consisting of a digital mirror device, a galvanometer scanner, a spatial light modulator, a laser with variable beam expander, or an acousto-optic deflector. In certain aspects, the optical tagging system comprises a multiphoton laser-scanning system. The system may or may not further comprise an imaging system capable of imaging a plurality of structures and identifying one or more target structures among the plurality of structures. The system may or may not further comprise a structure sorting system capable of detecting fluorescence, bioluminescence, forward scatter, side scatter, or a combination thereof.

In some embodiments, the method for screening cells comprises the steps of: introducing a plurality of cells to an imaging system, wherein one or more cells comprise at least one taggable marker; imaging the plurality of cells using the imaging system; identifying one or more target cells among the plurality of cells; tagging each target cell, wherein each target cell is selectively illuminated with an excitation light causing at least one taggable marker within the target cell to be phototransformed; and isolating at least one of the tagged target cells from the plurality of cells with a cell sorter. In some embodiments, the system for screening cells comprises an optical tagging system that comprises one or more systems for patterning light selected from the group consisting of a digital mirror device, a galvanometer scanner, a spatial light modulator, a laser with variable beam expander, or an acousto-optic deflector.

It is specifically contemplated that any limitation discussed with respect to one embodiment of the invention may apply to any other embodiment of the invention. Furthermore, any composition of the invention may be used in any method of the invention, and any method of the invention may be used to produce or to utilize any composition of the invention. Aspects of an embodiment set forth in the Examples are also embodiments that may be implemented in the context of embodiments discussed elsewhere in a different Example or elsewhere in the application, such as in the Brief Summary, Detailed Description, Claims, and Brief Description of the Drawings.

The foregoing has outlined rather broadly the features and technical advantages of the present disclosure in order that the detailed description that follows may be better understood. Additional features and advantages will be described hereinafter which form the subject of the claims herein. It should be appreciated by those skilled in the art that the conception and specific embodiments disclosed may be readily utilized as a basis for modifying or designing other structures for carrying out the same purposes of the present designs. It should also be realized by those skilled in the art that such equivalent constructions do not depart from the spirit and scope as set forth in the appended claims. The novel features which are believed to be characteristic of the designs disclosed herein, both as to the organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying drawing, in which:

FIGS. 2A-2B are charts showing the comparison of the contrast ratio and photoactivation kinetics of three photoactivatable proteins and two expression contexts (chromosomal and plasmid) for one of the three photoactivatable proteins;

FIGS. 6A-6B are an image and a chart, respectively, showing the selective tagging of a single mammalian cell using a photoactivatable dye and 2-photon laser scanning;

FIGS. 10A-10B are charts showing the calibration of the FACS photoactivated cell gate to sort tagged yeast cells using control samples and the application of the FACS gate to sort a larger representative sample of yeast cells, respectively;

DETAILED DESCRIPTION

Figure 1A:
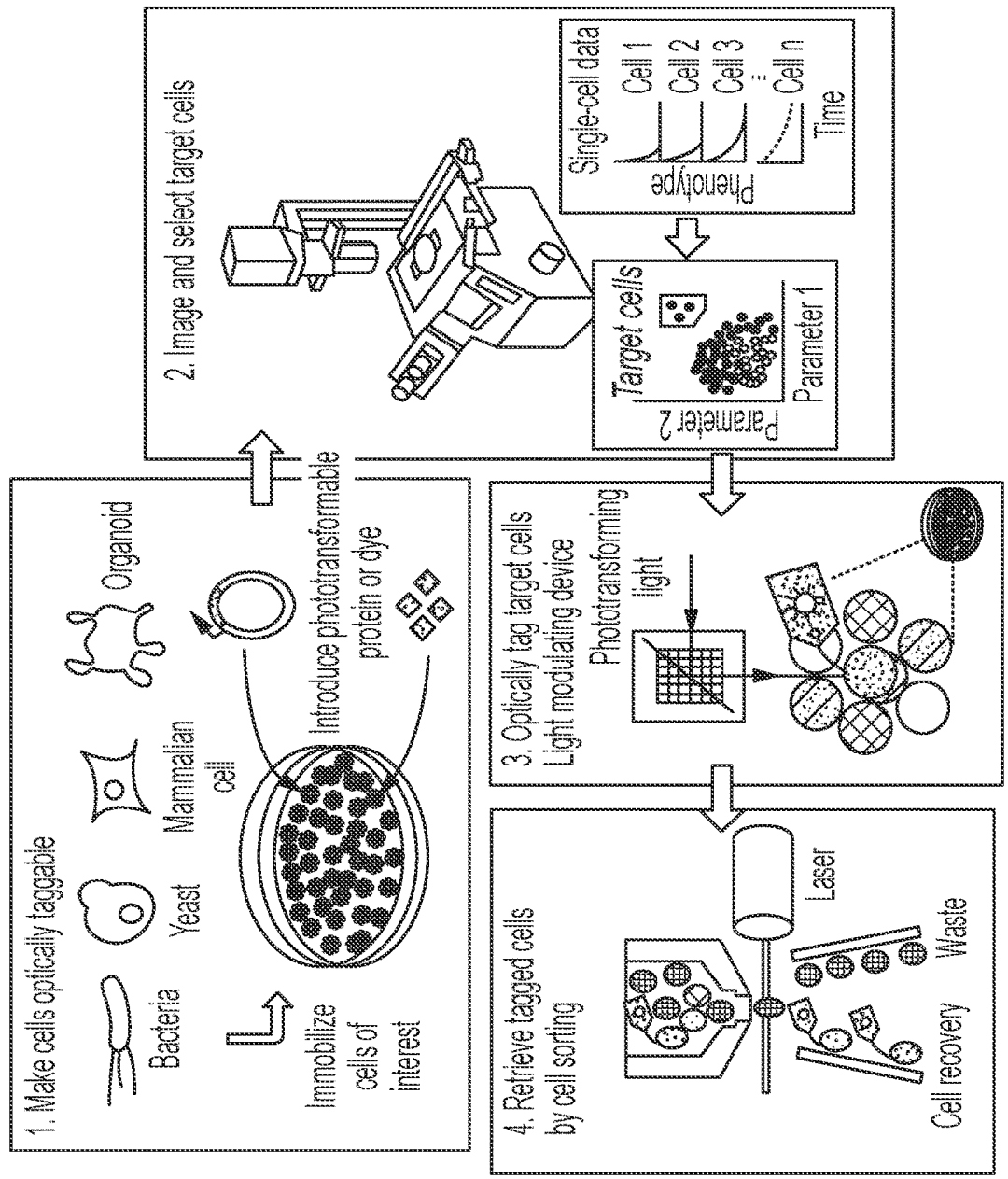
FIGS. 1A-1B are overview diagrams showing various embodiments of the platform of the disclosure.

In keeping with long-standing patent law convention, the words "a" and "an" when used in the present specification in concert with the word comprising, including the claims, denote "one or more." Some embodiments of the disclosure may consist of or consist essentially of one or more elements, method steps, and/or methods of the disclosure. It is contemplated that any method or composition described herein can be implemented with respect to any other method or composition described herein and that different embodiments may be combined.

As used herein, the terms "or" and "and/or" are utilized to describe multiple components in combination or exclusive of one another. For example, "x, y, and/or z" can refer to "x" alone, "y" alone, "z" alone, "x, y, and z," "(x and y) or z," "x or (y and z)," "(x and z) or y, or "x or y or z." It is specifically contemplated that x, y, or z may be specifically excluded from an embodiment.

Throughout this application, the term "about" is used according to its plain and ordinary meaning in the area of cell and molecular biology to indicate that a value includes the standard deviation of error for the device or method being employed to determine the value.

The term "comprising," which is synonymous with "including," "containing," or "characterized by," is inclusive or open-ended and does not exclude additional, unrecited elements or method steps. The phrase "consisting of" excludes any element, step, or ingredient not specified. The phrase "consisting essentially of" limits the scope of described subject matter to the specified materials or steps and those that do not materially affect its basic and novel characteristics. It is contemplated that embodiments described in the context of the term "comprising" may also be implemented in the context of the term "consisting of" or "consisting essentially of."

Reference throughout this specification to "one embodiment," "an embodiment," "a particular embodiment," "a related embodiment," "a certain embodiment," "an additional embodiment," or "a further embodiment" or combinations thereof means that a particular feature, structure or characteristic described in connection with the embodiment is included in at least one embodiment of the present invention. Thus, the appearances of the foregoing phrases in various places throughout this specification are not necessarily all referring to the same embodiment. Furthermore, the particular features, structures, or characteristics may be combined in any suitable manner in one or more embodiments.

The term "sample," as used herein, generally refers to a biological sample. The sample may be taken from tissue or cells or from the environment of tissue or cells. In some examples, the sample may comprise cells from a tissue biopsy, blood (e.g., whole blood), blood plasma, extracellular fluid, dried blood spots, cultured cells, culture media, discarded tissue, bacterial samples, fungal tissue, archaea, and/or protozoans. The sample may have been isolated from the source prior to collection. Non-limiting examples include cells from blood, cerebral spinal fluid, pleural fluid, amniotic fluid, lymph fluid, saliva, urine, stool, tears, sweat, or mucosal excretions, and other bodily fluids isolated from the primary source prior to collection. In some examples, the sample is isolated from its primary source (cells, tissue, bodily fluids such as blood, environmental samples that comprise cells, organoids of any kind, etc.) during sample preparation. The sample may be obtained from a living individual or a deceased individual. The sample may be derived from an extinct species including but not limited to samples derived from fossils. The sample may or may not be purified or otherwise enriched from its primary source. The sample may be preprocessed with inorganic materials, such as microbeads, nanoparticles, or antibody stains, as examples. In some cases the primary source is homogenized prior to further processing. The sample may be filtered or centrifuged to remove buffy coat, lipids, or particulate matter. The sample may also be purified or enriched for nucleic acids, or may be treated with RNases. The sample may contain tissues or cells that are intact, fragmented, or partially degraded.

"Cell" is defined by its ordinary meaning. A "cellular structure" has the same definition as a cell.

"Subcellular structure" is a subcellular organelle or a region/fragment of a cellular structure. Non-limiting examples of subcellular organelles include the nucleus, mitochondria, centrosome, lysosome, cell wall, cell membrane, Golgi complex, vesicles, and vacuoles. Non-limiting examples of regions of a cellular structure include villi, cilia, neuronal dendrites, neuronal axons, neuronal axon terminals, neuronal axon initial segment, and so forth.

"Multicellular structure" is defined as a tissue, organ, organoid, or organism that is made up of many cellular structures. Non-limiting examples of tissues include epithelial, connective, muscular, and nervous tissue. Non-limiting examples of organoids include enteroids, intestinal organoids, stomach organoids, gut organoids, gastric organoids, lingual organoids, thyroid organoids, thymus organoids, testicular organoids, hepatic organoids, pancreatic organoids, epithelial organoids, lung organoids, kidney organoids, gastruloids, blastoids, cardiac organoids, and retinal organoids. Non-limiting examples of multicellular organisms include nematodes, larvae, *Dictyostelium* fruiting bodies, and Hydra.

"Taggable marker" is defined as a composition that comprises a phototransformable molecule. Non-limiting examples of a taggable marker include phototransformable proteins, phototransformable dyes, proteins covalently linked with a phototransformable molecule, nucleic acids covalently linked to a phototransformable molecule, antibodies covalently linked with a phototransformable molecule, and glycans covalently linked with a phototransformable molecule.

"Selectable marker" is defined by its ordinary meaning and includes both positive and negative markers. Non-limiting examples of selectable markers include antibiotic resistance, auxotrophy, and ganciclovir sensitivity.

"Target structure" is defined as a cellular, subcellular, or multicellular structure that exhibits one or more phenotypes of interest.

"Tagged structure" is defined as a cellular, subcellular, or multicellular structure containing a taggable marker that has been illuminated with excitation light such that the phototransformable molecule in the taggable marker is phototransformed into a different state of fluorescence.

"Tagged target structure" is defined as a target structure containing a taggable marker that has been illuminated with excitation light such that the phototransformable molecule in the taggable marker is phototransformed into a different state of fluorescence.

The present disclosure provides a versatile and general screening platform applicable to a broad range of purposes, including at least experimental preparation. FIG. 1A provides an overview of some embodiments of the present disclosure. In step 1 of these embodiments, cellular (bacterial, yeast, or mammalian cells) and/or multicellular structures(organoids) of interest are made optically taggable by introducing a phototransformable protein or dye to the structure. In step 2, the structures are imaged and quantifiable properties are extracted from observed phenotypes. Target structures with phenotypes of interest are identified based on the quantifiable properties. In step 3, these target structures are then optically tagged for retrieval by selectively illuminating phototransforming light on the target structures. In step 4, the tagged target structures are detected and isolated using a cell sorter. The sorted structures are genotyped or regrown for further characterization.

Figure 1B:
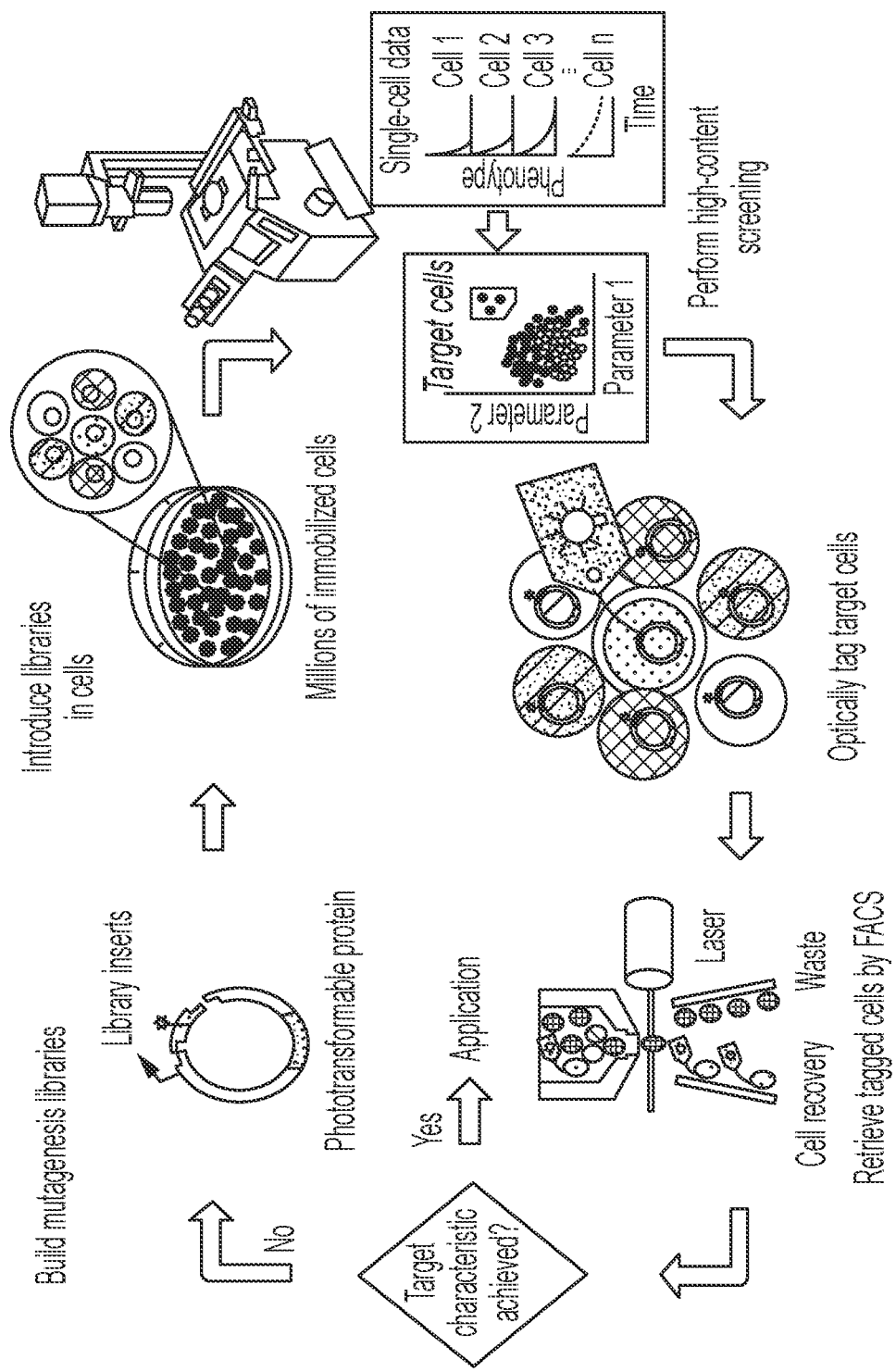

In some embodiments, the platform is implemented for screening engineered mutagenesis libraries to develop novel proteins or nucleic acids, such as biosensors, antibodies, enzymes, promoters, internal ribosome entry sites (IRES), terminators, and Kozak sequences. FIG. 1B illustrates an overview of some embodiments of the disclosure that screen engineered mutagenesis libraries. In this embodiment, mutagenesis libraries are prepared with a vector co-expressing a phototransformable protein and introduced to host cells, such that individual cells only express a single variant. These cells are then imaged using a motorized microscope. The phenotypic characteristics of each individual cell are quantified by automated image analysis, and cells meeting certain target criteria are identified as target cells. These target cells are then optically marked for isolation by individually activating the phototransformable protein. The tagged target cells are detected and isolated from non-tagged cells using FACS, as an example of a sorting system. These sorted cells can be regrown for further characterization, to subject their vectors to additional rounds of screening, or both.

In some embodiments, each cell is over-expressing or under-expressing a different polynucleotide using parallel approaches including shRNAs or CRISPR activation, interference, and knock-out strategies. In a specific embodiment, the screening is performed for a human cell line. The cell line may be of any kind, but in one embodiment, the cell line is of neuronal origin that stably overexpresses one of the following disease-triggering proteins: wild-type tau, wild-type aSyn, mutant Huntingtin, or mutant Ataxin 1. Proteolytic activity is quantified using biosensors of lysosomal flux. Cells showing increased proteolytic activity are tagged and subsequently retrieved. In other embodiments, the platform is used to screen for genetic determinants of disease phenotypes that are characterized by aberrant cellular morphology and/or protein localization profile. In some embodiments, the tagging of cellular structures is based on their spatial location in a tissue. These tagged structures are sorted, and their transcriptome or proteome investigated to find a new genetic maker for spatial specificity. In other embodiments, the tagging of cellular structures is based on their activity as defined by the presence of biosensors of any kind, such as calcium, voltage, pH, neurotransmitters, redox potential, and chloride. Cells sorted by these characteristics can be used to understand cell activity in both normal and diseased tissue, thus helping uncover molecular characteristics that can be leveraged when designing therapeutic strategies. In other embodiments, cellular structures can be screened to monitor the dynamics of metabolite/chemical production.

Because any phenotype that is optically differentiable under a microscope can be screened, the imaging system need only be amenable to imaging and identifying that phenotype. Two aspects of imaging systems techniques include the spatial presentation and absorption properties of the illuminating light. For example, the spatial presentation of the illuminating light can be performed by widefield, point/line-scanning, or random-access techniques. Non-limiting examples of microscopy techniques for setting the absorption properties of the illuminating light include bright-field imaging (including differential interference contrast, phase contrast, and Dodt-gradient contrast microscopy), single- or multi-photon fluorescence or photoacoustic microscopy, bioluminescence, and several non-linear techniques such as Raman scattering.

For screens of large libraries, some embodiments incorporate techniques for faster imaging by the imaging system, such as using objectives with lower magnification, widefield lens-less detectors, larger or multiple detectors, faster motorized stages, and/or denser cultures.

In specific embodiments, after imaging, identification of cells exhibiting a phenotype of interest can be a rate-limiting step. To address this, some embodiments employ automated computational analysis of the image to identify a target cell. In specific embodiments, machine learning is used to identify target cells that meet certain desired criteria. The location and/or morphology of these target cells may be stored as metadata for reference by the optical tagging system.

In particular embodiments of the disclosure, each cell being screened comprises at least one taggable marker that includes a phototransformable molecule, such as a protein, dye, or other compound. These phototransformable molecules can be categorized into three types—photoactivating, photoconverting, and photoswitching—based on their responses to light. In certain embodiments, the cell comprises more than one type of phototransformable molecule.

Some embodiments employ photoactivatable molecules as part of the taggable marker, which can be "switched on" from a low or no fluorescent state to a higher fluorescent state. Upon photoactivation, the molecule emits bright fluorescence of a particular color. Non-limiting examples of photoactivatable proteins include PA-GFP, PA-sfGFP, PAmCherry1, PATagRFP, PAmKate, and Phamret. Non-limiting examples of photoactivatable dyes include PA-JF549, PA-JF646 (Grimm 2016), DCDHF-based photoactivatable dyes (Lord 2008), and BODIPY-based photoactivatable dyes (Sansalone 2008).

Some embodiments use photoconvertible molecules as part of the taggable marker, which already emit fluorescence in their non-converted state. Upon photoconversion, the fluorescence emission of the molecule changes to a different color. Non-limiting examples of photoconvertible proteins include Kaede, Dendra2, mClavGR2, mMaple, PS-CFP2, Meos3.2, EosFP, mEosFP, mEos2, mEos3.2, mEos4a, mEos4b, tdEos, kikGR (Kikame), PsmOrange, PsmOrange2, and mKikGR. A non-limiting example of a photoconvertible dye includes DiR-based photoconvertible dyes (Carlson 2013).

Both photoactivation and photoconversion result from irreversible light-induced covalent modification of chromophore structures. Conversely, photoswitching results from reversible conformational changes that allow the chromophore to switch between "on" and "off" states. Such can be photoswitched from a dark state to a bright fluorescent state ("kindling"), and from a bright state to a dark non-fluorescent state ("quenching"). The photoswitch can occur multiple times by activating with two distinct wavelengths of light, in at least some examples.

Some embodiments use photoswitchable molecules as part of the taggable marker. Non-limiting examples of photoswitchable proteins include mTFP0.7, PDM1-4, Dronpa, Dronpa-2, Dronpa-3, bsDronpa, Padron, Padron0.9, Mut2Q, rsFastLime, rsKame, Dreiklang, mGeos-M, EYQ1, KFP1, rsCherry, rsCherryRev, rsTagRFP, mApple, asFP595, Kindling FP, rseGFP, and rseGFP2. Non-limiting examples of photoswitchable dyes include Atto 488, Cy3B, Alexa 647, Cy7, Alexa 750, and Si-Rhodamine dyes.

In specific embodiments, the phototransforming the phototransformable molecule results in the emission of bioluminescence in addition to or instead of fluorescence. For example, in a specific embodiment, a luciferase comprises a phototransforming molecule that, when phototransformed, enables the luciferase to undergo the chemical reaction that emits bioluminescence. In some specific embodiments, the chemical reaction does not occur until a reagent is added to the structure's environment. In some embodiments, tagged structures are introduced to the necessary reagents for bioluminescence immediately prior to sorting.

In certain embodiments, excitation of a phototransformable protein would result in the activation of one or more selectable markers. Non-limiting examples of selectable markers include antibiotic resistance markers or auxotrophic markers. In specific embodiments, the phototransformable protein comprises a recombinase, which, upon activation, flips a DNA sequence, such as a promoter or a terminator, causing the selectable marker to be expressed. In other embodiments, the phototransformable protein comprises an excisionase, which, upon activation, removes a terminator between the promoter and the gene encoding the selectable marker causing the marker to be expressed. In other embodiments, the gene expression system comprises a phototransformable molecule that, upon phototransformation, causes the expression of the recombinase, which then causes the selectable marker to be expressed. Cells containing the activated selectable markers in the above embodiments can be cultured in an environment that is only amenable to cells expressing the selectable markers.

In some embodiments, the phototransformable protein is part of a fusion protein. In certain embodiments, the phototransformable protein is fused to the C-terminal end of the fusion protein. In some embodiments, the phototransformable protein is fused to the N-terminal end of the fusion protein. In other embodiments, the fusion protein comprises multiple phototransformable proteins.

In some embodiments, selection of a phototransformable molecule to use for tagging is based on an evaluation of several parameters, including, but not limited to, brightness, photostability, contrast ratio, photoactivation kinetics, cell viability, pH stability, or a combination thereof.

In some embodiments, contrast ratio of the phototransformable molecule in the cellular, subcellular, or multicellular structure is an important parameter to evaluate because a high contrast ratio usually indicates that the molecule has a low level of spontaneous fluorescence prior to excitation resulting in an increased signal-to-noise ratio. Similarly related to the contrast ratio are the photoactivation kinetics (photoactivation half-life), which measures how quickly the phototransformable molecule reaches its maximum contrast ratio. In certain embodiments, the contrast ratio has to be high enough and the photokinetics fast enough that it enables single structures to be extracted from hundreds of thousands to millions of structures by FACS.

Cell viability is another factor to consider in optimizing the application of phototransformable molecules because a prolonged duration of exposure to excitation light can cause photodamage to the cell. The ability of cells to divide after photoactivation is not necessarily required because genotypes can be obtained by sequencing methods such as single-cell sequencing or next-generation sequencing (NGS). However, in some embodiments, the ability of target cellular structures to grow after isolation enables simple plasmid extraction and sequencing, obviating the need for single-cell sequencing. In some embodiments, photoactivation times last between 45 s to 60 s to maximize photoactivation while minimizing loss of cell viability. In other embodiments, photodamage is reduced by using higher wavelength, lower energy light to initiate photoactivation. In specific embodiments utilizing multi-photon-based photoactivation, photoactivation times last less than 10 s, which further minimizes the loss of cell viability. In some embodiments, photodamage is reduced by placing the cells in media with reactive species scavengers and antioxidants.

Key to the methods and systems of the disclosure is the ability to selectively tag structures without unwanted tagging of adjacent cells. One aspect of this invention involves a system for screening cells, comprising an optical tagging system, capable of selectively illuminating with excitation light a target structure comprising one or more taggable markers among a plurality of structures also comprising one or more taggable markers.

Selective tagging requires the ability to spatially pattern light only onto the target location(s) on a sample. Non-limiting examples of approaches to spatially and selectively pattern light include a digital mirror device (DMD), galvanometer scanners, spatial light modulators (SLM), lasers with variable beam expanders, or acousto-optic deflectors In some embodiments, the system for screening cells includes both an imaging system for imaging the cells and identifying target cells as wells as an optical tagging system.

Different cellular structure types other than yeast can also be selectively tagged. Non-limiting examples of cellular structure types that are amenable to selective tagging include prokaryotic cells, such as bacteria and archaea, and eukaryotic cells, such as protists, fungi, plants, and animal cells. Additionally, selective tagging can also be performed on subcellular structures, such as nuclei and mitochondria, and multicellular structures, such as enteroids, organoids, tissue, and multicellular organisms. These structures can also be screened both in vitro and in vivo.

In some embodiments, cellular, subcellular, or multicellular structures in tissues or a whole organisms can be screened in vivo by creating a transgenic animal expressing a taggable marker or by applying phototransformable dye to regions of interest. The tissue or organism is imaged and optically tagged. Because tissues and organisms are no longer single-layer, imaging and tagging are performed using deep tissue techniques, such as confocal imaging, multiphoton microscopy, microendoscopy, or light sheet imaging. If the sample is sparse, single-photon-based techniques can be amenable, such as a one-photon laser with a confocal microscope or widefield illumination patterned by a DMD. Following tagging of the sample, the cellular, subcellular, or multicellular structures of the tissue or organism can then be dissociated in order to perform sorting by sorting techniques, such as FACS.

In most embodiments of disclosure, the number of tagged target structures will be much smaller than the total number of structures in the sample. Isolating the tagged target structures is paramount to the methods of the disclosure. In some embodiments, the tagged target structures are isolated using a structure sorter capable of distinguishing between tagged and untagged structures using fluorescence/bioluminescence detection. A range of fluorescence/bioluminescence intensities ("gate") is set to distinguish between tagged and untagged structures.

In certain embodiments, the structure sorter is a FACS, which is capable of sorting single cells at rates of up to 20,000 cells/s. The FACS system is calibrated for the particular cellular system being screened to determine the gates for tagged cells.

In some embodiments, the structure sorter is also capable of sorting by structure size and/or granularity along with fluorescence. For example, the FACS sorter is capable of sorting based on forward-scatter (size) and/or side scatter (granularity). This approach allows for tagged cellular, subcellular, or multicellular structures of different shape and/or size to be isolated from each other. For example, in some specific embodiments, the cellular structures imaged have varying morphologies. Cellular structures with interesting morphologies are tagged, and the sorter isolates tagged structures with certain shapes and/or sizes into a single container while the non-tagged and tagged cells that do not meet the gate parameters for sorting are deposited in a different container. Successive sorting with new gate parameters can then be performed on the cells that did not meet the previous gate parameters. In other specific embodiments, the cellular structures imaged comprise bacterial and mammalian cells. Interacting pairs or groups of bacterial and mammalian cells can be tagged, and then successfully sorted to isolate tagged bacterial cells from tagged mammalian cells.

The implementation of structure sorting to isolate tagged target structures can be a rate-limiting step in the screening throughput. Some embodiments forego the need for isolation using sorting by implementing selectable markers along with tagged markers that contain phototransformable molecules. In some embodiments, the phototransformable molecule is a photoswitchable protein that comprises a recombinase, which, upon activation, flips a DNA sequence, such as a promoter or a terminator, causing the selectable marker to be expressed. Cells containing this system can be cultured in an environment that is only amenable to cells expressing the selectable markers. All surviving cells originate from the tagged cells. This approach strongly accelerates the high-throughput nature of the platform.

In some embodiments, the imaging of cellular, subcellular, or multicellular structures followed by identification of target structures followed by the tagging of those target structures can be repeated more than one time prior to isolation. In specific embodiments, cellular structures can be imaged after a first assay followed by identification and tagging of target cellular structures based on the first assay. The cellular structures can then be transferred to a second assay and then imaged. Target cellular structures can then be identified based on the results of the second assay. The target cellular structures can then be tagged using the same taggable marker, which will tag but not distinguish between cellular structures that meet the target characteristics for either assay or both. Or, the target cellular structures can be tagged using a different taggable marker of a different fluorescence, which will allow target cellular structures to be sorted based the target characteristics being assayed.

EXAMPLES

The following examples are included to demonstrate preferred embodiments of the invention. It should be appreciated by those of skill in the art that the techniques disclosed in the examples that follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Example 1. Screening Yellow Fluorescent Protein Variants Monitoring Photostability and Brightness A specific embodiment of the disclosure was employed to evaluate and optimize the photostability and brightness of yellow fluorescent proteins (YFPs) because they are commonly used in vitro and in vivo as fusion proteins, gene expression reporters, and protein biosensors. Among YFPs, mVenus was chosen as a starting template. Single-cell yeast libraries were developed using multi-site saturation mutagenesis. A new yeast screening vector was first developed co-expressing mVenus variants, PAmCherry1, and TagBFP.

Expression plasmids were cloned using standard cloning methods. To express constructs in yeast, the pJL1 plasmid was created by subcloning the strong constitutive pTHD3 promoter from the pYTK009 plasmid in pDR196, a multi-copy 2-micron plasmid with the URA3 auxotrophic selection marker and the tADH1 terminator. New restriction sites for NheI and BglII were introduced in pDR196 to flank the pTHD3 promoter. The BglII restriction site also functioned as the Kozak sequence. Ribosome-skipping 2A sequences from porcine teschovirus-1 virus (P2A) and *Thosea asigna* virus (T2A) were used for multicistronic expression.

All experiments with yeast cells were conducted using *Saccharomyces cerevisiae* BY4741 strain. All yeast expression plasmids encoded the URA3 gene as a selection marker. The transformed cells with plasmids containing URA3 selective marker was stably grown in yeast synthetic drop-out media at pH 7.0. To prepare yeast competent cells, the cells were first grown in Yeast extract Peptone Dextrose (YPD). Agar plates were prepared by adding 25 g/L of agar to liquid synthetic drop-out and YPD media.

Mutagenesis libraries were developed by simultaneously randomizing 3 predefined residues of the mVenus starting template. The residues of mVenus selected for modification were primarily chosen based on the residue's effect on photostability or conformational flexibility of the chromophore. Overall, 8 mutagenesis libraries were built that targeted 21 different residues of mVenus. For each library, 8 amino acids were simultaneously mutated, resulting in 8,000 possible combinations. Degenerate codons (NNS) were used to randomize each position with all 20 amino acids during polymerase chain reaction (PCR). The overlap regions between inserts and linearized vector were designed as 18 bp in length. A cloning kit was used for seamless DNA cloning. To maximize the transformation efficiency, the cells were heat-shocked for 1 hour and co-transformed with high purity single stranded DNA (ssDNA). Transformed yeast were plated on uracil drop-out agar plates and incubated at 37° C.

72 hours post-transformation, the colonies on the transformation plates were collected using a cell scraper into 1 mL of sterile water. Up to 54,400 colonies were obtained per library. The cells were washed 3 times with water and plated on glass bottom plates coated with a 0.1 mg/mL solution of poly-L-lysine. The attached cells were washed twice with water. After the final wash, water was replaced with PBS. Approximately 100,000 to 700,000 cells per library were assayed.

The yeast cells were immobilized on a glass bottom plate. Immobilized single cell libraries were imaged by widefield fluorescence imaging. Widefield imaging was performed using an inverted microscope equipped with a motorized XY stage with linear encoders, a hardware autofocus module, a 20×0.75-NA objective, and imaging software. Excitation light was emitted from a solid-state multi-spectral light engine. Excitation and emission light were routed to and from the sample, respectively, using multi-band dichroic mirrors located in a filter cube below the objective turret. Emission light was filtered with multi-band filters. To separate blue and yellow fluorescence, the beamsplitter was fitted with a dichroic mirror. Blue fluorescence was further filtered by a 450/50 m emission filter. To separate green and red fluorescence, the beamsplitter was fitted with a separate dichroic mirror. Red fluorescence was further filtered by a 632/60 m emission filter.

Automated imaging was performed by sequentially scanning 64 to 169 nonoverlapping field-of-views. Because the illuminated area (~1.2 mm$^2$) was larger than the field-of-view captured by the camera (~0.43 mm$^2$), the fields-of-view were spaced to avoid imaging previously illuminated areas. Yellow and blue fluorescence images were acquired for each field-of-view at 0, 22.5, and 45 s. Yellow fluorescence was imaged using 508/25-nm excitation light at 20 mW/mm$^2$ and a 50 ms exposure time. To image blue fluorescence, a 395/25-nm light was used with lower irradiance (3.2 mW/mm$^2$) to minimize non-selective photoactivation of PAmCherry1 during imaging. To ensure sufficient signal, a longer exposure time (400 ms) was used.

Photobleaching was performed by illuminating 508/25-nm excitation light at 20 mW/mm$^2$ for 45 s. Excitation light irradiance was calculated by dividing the measured power with the illumination area. For each objective used, the illumination area was determined by photoactivating a field-of-view of a dense culture of PamCherry1-expressing yeast cells; only the photoactivated cells emit red fluorescence, and therefore, the region that show red fluorescence correspond to the illuminated area.

Images were segmented to identify individual cells. Supervised pixel classification was performed on a single representative image of the blue channel (reference TagBFP image) at the 0 s time point using machine learning-based segmentation software, which generated a binary segmentation mask. The generation of segmentation masks for all additional fields-of-view as accelerated using code that extracts segmentation parameters from the initial segmentation mask and conducts segmentation of several images in parallel. Depending on the total number of fields-of-view and the degree of parallelization, segmentation speeds of ~3 s per field-of-view or ~5 min for a typical library were achieved. Because cells were immobilized and exhibited minimal movement during imaging, the segmentation mask from the initial time point could be used for later time points. Channel registration between the blue (segmentation) and yellow (test) channels was performed before applying the segmentation mask to the yellow channel.

To analyze the individual cells identified above, the mean yellow and blue channel pixel intensities (F(Y) and F(B), respectively) of each cell was computed for each time point (t). The brightness (B) of each cell was defined as the ratio of its yellow and blue mean pixel intensities at $t_0$, the initial time point, i.e. $B=F(Y, t_0)/F(B, t_0)$. Normalization by blue fluorescence was performed to reduce cell-to-cell variation caused by the variation of plasmid copy number. For screening experiments, the photostability (P) was defined as the fluorescence remaining after a period of continuous illumination, expressed as a fraction of the initial fluorescence, i.e. $P=F(Y, t_f)/F(Y, t_0)$, where $t_f$ is the final time point.

To increase the chance of the selected variant cells being significantly superior to the parental cells, a probabilistic model was generated. After brightness and photostability values were quantified for all cells, the joint cumulative distribution function (JCDF) of these two scores of the parental cells was computed using kernel density estimation. Using the brightness and photostability values of each cell of a given library, the JCDF was used to compute the probability of the library cells being better than the parental using the JCDF. Depending on the number of promising candidates, 60 to 200 cells were selected for optical tagging and recovery. Cell selection was automated but could be refined after manual inspection if desired.

The locations of the target cells were determined from the images metadata and used to automatically position the microscope stage so that target cells are located in the center of the field-of-view. Using a digital mirror device (DMD), tagging/photoactivation was performed on a 4 μm-by-4 μm region centered on the target cells. The photoactivation light irradiance measured at the sample plane was 88 mW/mm$^2$. Photoactivation occurred for 45-60 s. The microscope automatically and sequentially photoactivated target cells. For each target cell, red fluorescence images were taken using 550/15 nm light at 67 mW/mm$^2$ before and after photoactivation, and the emitted light was filtered by a 632/60-nm filter.

After photoactivation, all cells were detached from the glass-bottom plates by removing the culture medium and incubating the cells in a trypsin-EDTA solution for 10 min at 37° C. Cells were pipetted up and down rigorously to promote detachment and resuspension into single cells. Detached cells were washed once and resuspended with phosphate-buffered saline (PBS).

A flow cytometry cell sorter was used to detect and retrieve cells that were optically tagged. FlowJo software was used to analyze flow cytometry data. Two controls were used to determine gates for photoactivated cells, both expressing the parental mVenus, PAmCherry1, and the reference TagBFP. The negative control (with no photoactivation) had no photoactivated cells while the positive control (1 field-of-view photoactivation) corresponds to photoactivation of several hundreds of cells in a single field-of-view. The two controls were compared and the photoactivated cell gate was determined by selecting the region that had cells present only in the positive control.

Using the FACS, photoactivated cells were sorted in a 5-mL tube containing synthetic drop-out media and plated on a synthetic drop-out agar plate. All photoactivated cells were sorted into a single tube, plated onto an agar plate, and incubated at 37° C. for 72 hours to enable colony formation.

Colonies grown from the sorted sample were grown in synthetic drop-out media for population-level analysis. Plasmid DNA was prepared from promising variants using a yeast plasmid miniprep kit and sequenced to identify novel mutations.

Ten rounds of screening identified a variant that resulted in ~4-fold longer photobleaching half-lives in yeast and mammalian cells without any loss in brightness as compared to the original mVenus precursor.

Example 2. Comparison of the Photoactivation Contrast Ratio and Kinetics of Four Photoactivatable Protein Expressions FIG. 2 shows the comparison of the photoactivation contrast ratio and kinetics of four photoactivatable protein expressions (PamCherry1 plasmid expression, PATagRFP plasmid expression, PamKate plasmid expression, and PamCherry1 chromosomal expression) in yeast cells after excitation. Yeast cells constitutively expressing different photoactivatable red fluorescence proteins (PA-RFPs) were either expressed from a multi-copy 2-micron plasmid or from the genome. For each PA-RFP, a field-of-view containing 6,000 to 8,000 cells were simultaneously photoactivated by continuously shining 410/20 nm light at 11.4 mW/mm$^2$ for 5 min. RFP intensity was monitored every 10 s during photoactivation. FIG. 2A shows the contrast ratio of individual cells was defined as the RFP/RFP$_0$, where RFP is the measured red fluorescence at a particular timepoint and RFP$_0$ is the fluorescence at the 0 s timepoint. Data points correspond to the mean contrast ratio and the error bars represent the standard error of the mean (s.e.m.) p≤0.0001, Welch's ANOVA test comparing the areas under the curves of individual cells expressing different PA-RFPs. ** represents p≤0.0001 for post-hoc test (Games-Howell's multiple comparison test). Of the four protein expressions in yeast cells, the PamCherry1 plasmid expression produced a contrast ratio nearly four times larger than the expression with the next highest contrast ratio. FIG. 2B shows the mean photoactivation half-life—the time to reach half of the maximum photoactivation contrast ratio—for individual cells expressing the four PA-RFPs. The error bars represent s.e.m. p≤0.0001, Welch's ANOVA test. ** represents p≤0.0001 and "ns" represents "not significant" for the post hoc test (Games-Howell's multiple comparison test). Both PamCherry1 plasmid expression and PamCherry1 chromosomal expression had nearly three times faster intensity changes than other PA-RFPs in yeast cells.

Example 3. Comparison of PAmCherry1 Photoactivation with Yeast Cell Viability

Figure 3:
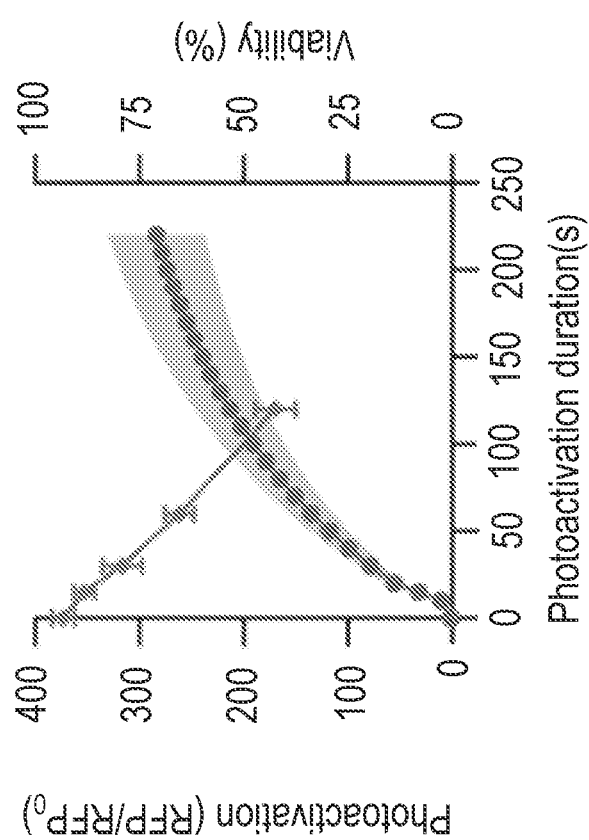
FIG. 3 is a chart showing an overlay of the PAmCherry1 photoactivation curve and the yeast cell viability curve.

FIG. 3 shows an overlay of the photoactivation curve and the cell viability curve where longer pulses of violet light increased photoactivation of PAmCherry1 but decreased viability of the yeast cells, which is defined as the proportion of yeast cells that grew after photoactivation. The error bars indicate the s.e.m. of n=3 independent trials. In each trial, 15 cells per photoactivation duration were evaluated. Photoactivation times between 45 s to 60 s allowed for ~100-fold activation with ~30% loss of cell viability.

Example 4. Selective Tagging with a Digital Mirror Device

Figure 4:
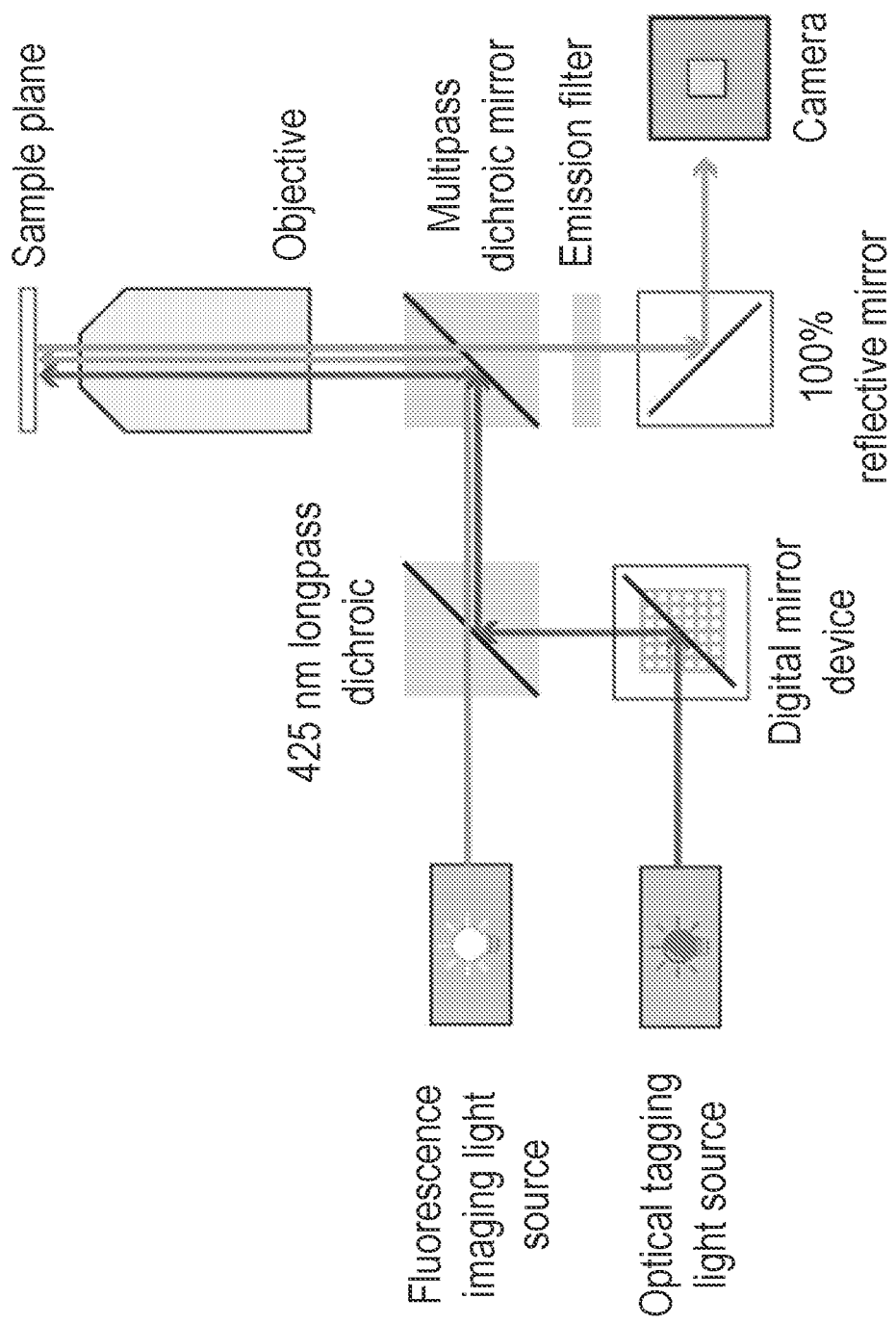
FIG. 4 is a schematic of the optical train for the optical tagging system and the imaging system in some embodiments of the disclosure.

FIG. 4 is a schematic of the optical train for one embodiment of the disclosure. This embodiment includes both an imaging and optical tagging system. The optical tagging system incorporates a collimated beam of an 410/20-nm light source which is spatially patterned by a DMD to selectively illuminate and optically tag target cells. The optical tagging light is combined with the imaging light (>425 nm wavelength) from the imaging system using a 2-mm-thick 425-nm long-pass dichroic mirror. Excitation light is reflected by a multipass dichroic mirror and focused onto the sample by an objective. Light emitted from the sample is collected by the objective, transmitted through the multipass dichroic mirror, filtered by a multipass emission filter, and imaged using a camera.

Figure 5B:
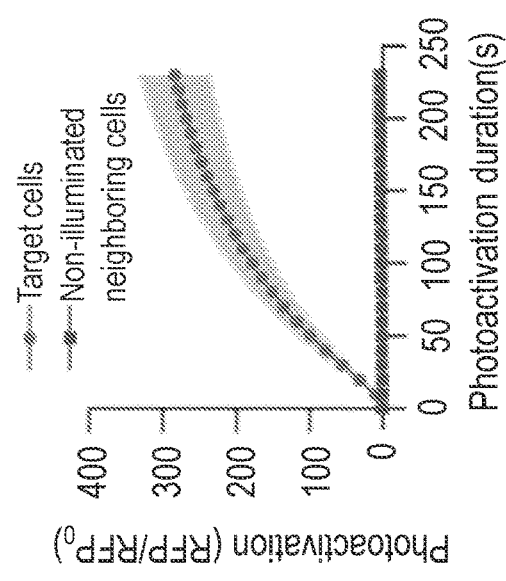
FIGS. 5A-5B are an image and a chart, respectively, showing the selective tagging of a single yeast cell using a photoactivatable protein and a digital mirror device.
Figure 5A:
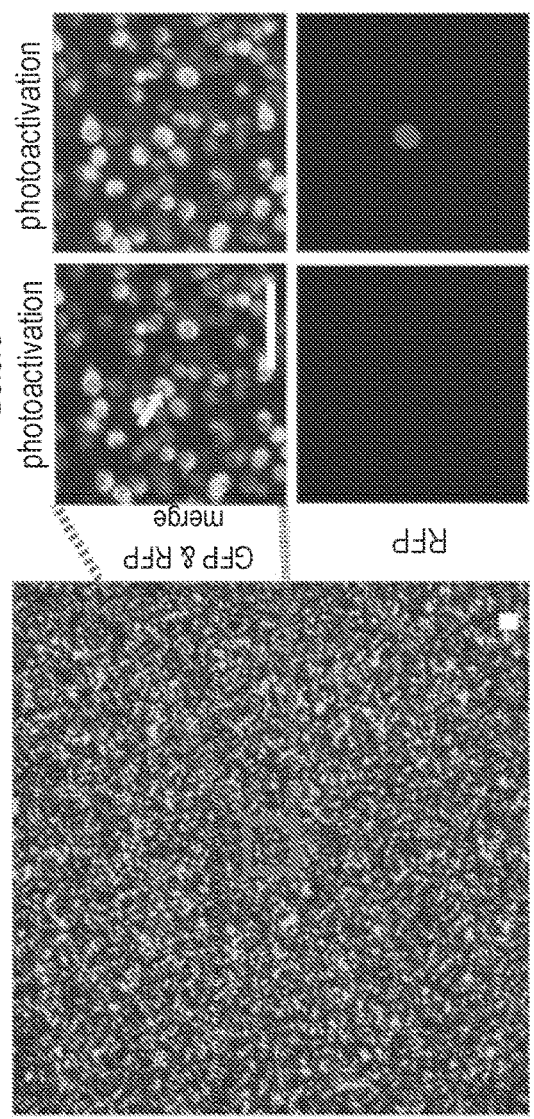

FIG. 5A illustrates the results of selective tagging of the system shown in FIG. 4. The left image represents an experiment where millions of yeast are immobilized on a 190 mm$^2$ glass-bottom plate, yielding a dense monolayer of ~5,000 cells per field-of-view (i.e. ~25,000 cells/mm$^2$). All cells are co-expressing EGFP and PamCherry1. The right image shows a smaller subset of these cells before and after selective photoactivation. A target cell (indicated by arrow) was selectively illuminated by violet light using a digital mirror device. The DMD patterned the photoactivation light to illuminate a region approximately the same size as a yeast cell (16 μm$^2$). Robust red fluorescence was observed in the target cell but not in neighboring, non-illuminated cells. FIG. 5B shows a comparison of the mean photoactivation contrast ratio of the target cells to that of non-illuminated neighboring cells. Optical tagging was specific to the target cells, with negligible activation of neighboring cells ($p \leq 0.0001$, unpaired two-tailed t-test comparing the areas under the curves). The shaded regions represent the s.e.m., n=18 cells/group.

Example 5. Selective Tagging with 2-Photon Laser Scanning

FIG. 6A shows mammalian HEK293A cells that were co-transfected with EGFP and PamCherry1 before photoactivation and after photoactivation. A target cell (indicated by arrow) was selectively illuminated with 2-photon laser scanning at 800 nm. Only the target cell exhibited the red fluorescence associated with photoactivated PamCherry1. FIG. 6B shows a comparison of the mean photoactivation contrast ratio of target cells to that of non-illuminated neighboring cells. Optical tagging with 2-photon laser scanning was specific to the target cells, with negligible activation of neighboring cells ($p \leq 0.0001$, unpaired two-tailed t-test comparing the areas under the curves). The shaded regions represent the s.e.m., n=8 cells/group.

Figure 7:
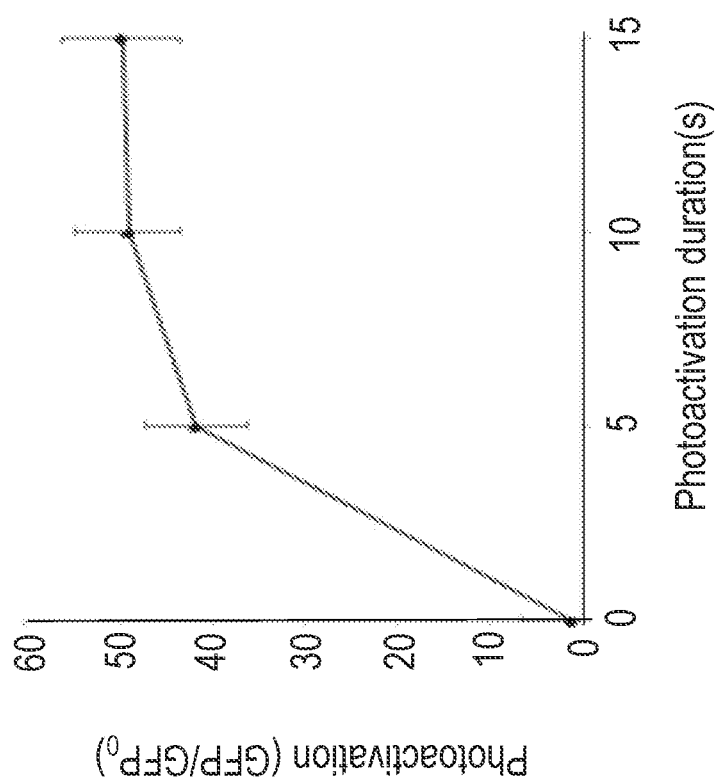
FIG. 7 is a chart showing the selective tagging of mammalian cells using a photoactivatable green fluorescent protein under 2-photon laser scanning.

FIG. 7 Shows the photoactivation contrast ratio of single HEK293 cells as a function of time. The cells were transfected with a plasmid expressing PA-sfGFP under the control of the strong constitutive cytomegalovirus (CMV) promoter. 48 hours post transfection, cells were photoactivated using 2-photon laser scanning at 780 nm. Every second, cells (~120 pixels) were illuminated with a 50 mW laser. Scanning was performed with a 4 µs dwell time and cells were exposed to ~20 µJ every second. The maximal fluorescence contrast ratio (~50) was achieved in ~10 seconds. The graph shows the mean of n=6 cells.

Example 6. Selective Tagging of Bacterial and Mammalian Cells

Figures 8A, 8B:
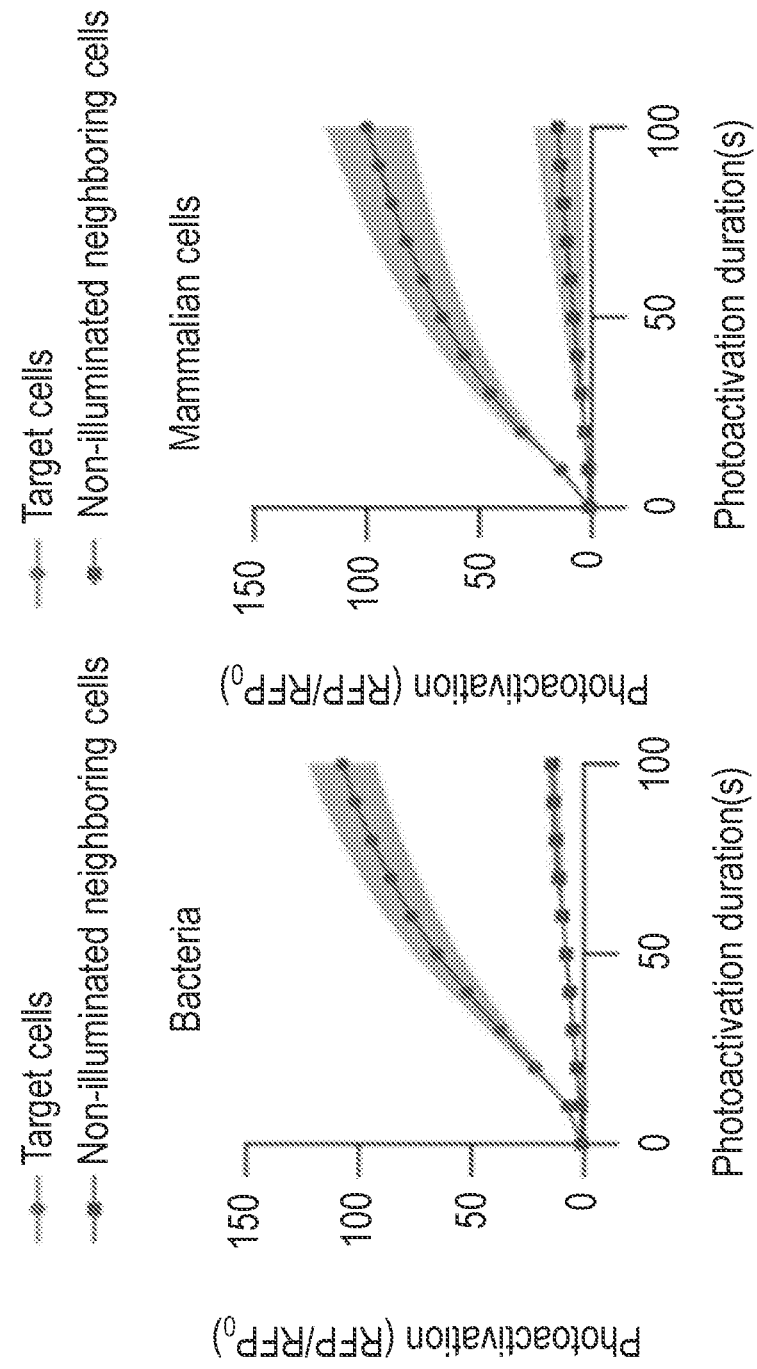
FIGS. 8A-8B are charts showing the selective tagging of a single bacterial cell and a single mammalian cell using a photoactivatable protein and a digital mirror device.

FIG. 8A shows a comparison of the mean photoactivation contrast ratio of target bacterial cells to that of non-illuminated neighboring bacterial cells. The bacteria were transformed with a high-copy plasmid co-expressing EGFP and PamCherry1 from the same promoter and attached to a glass-bottom plate. Individual cells were positioned in the center of the field-of-view and selectively photoactivated by the DMD illuminating a region approximately the same size as a bacterial cell (4 µm$^2$) using a 1.2 µW excitation light. Optical tagging with DMD was specific to the target bacterial cells, with negligible activation of neighboring bacterial cells ($p \leq 0.0012$, unpaired two-tailed t-test comparing the areas under the curves). The shaded regions represent the s.e.m., n=7 cells/group.

FIG. 8B shows a comparison of the mean photoactivation contrast ratio of target mammalian cells to that of non-illuminated neighboring mammalian cells. The mammalian cells (HEK293A cell line) were transfected with a plasmid co-expressing EGFP and PamCherry1 under the control of the strong constitutive cytomegalovirus (CMV) promoter. Individual cells were positioned in the center of the field-of-view and selectively photoactivated by the DMD illuminating a region approximately the same size as a mammalian cell (64 µm$^2$) using a 2.1 µW excitation light. Optical tagging with DMD was specific to the target mammalian cells, with negligible activation of neighboring mammalian cells ($p \leq 0.0105$, unpaired two-tailed t-test comparing the areas under the curves). The shaded regions represent the s.e.m., n=5 cells/group.

Example 7. Selective Tagging of Enteroids

Figures 9A, 9B:
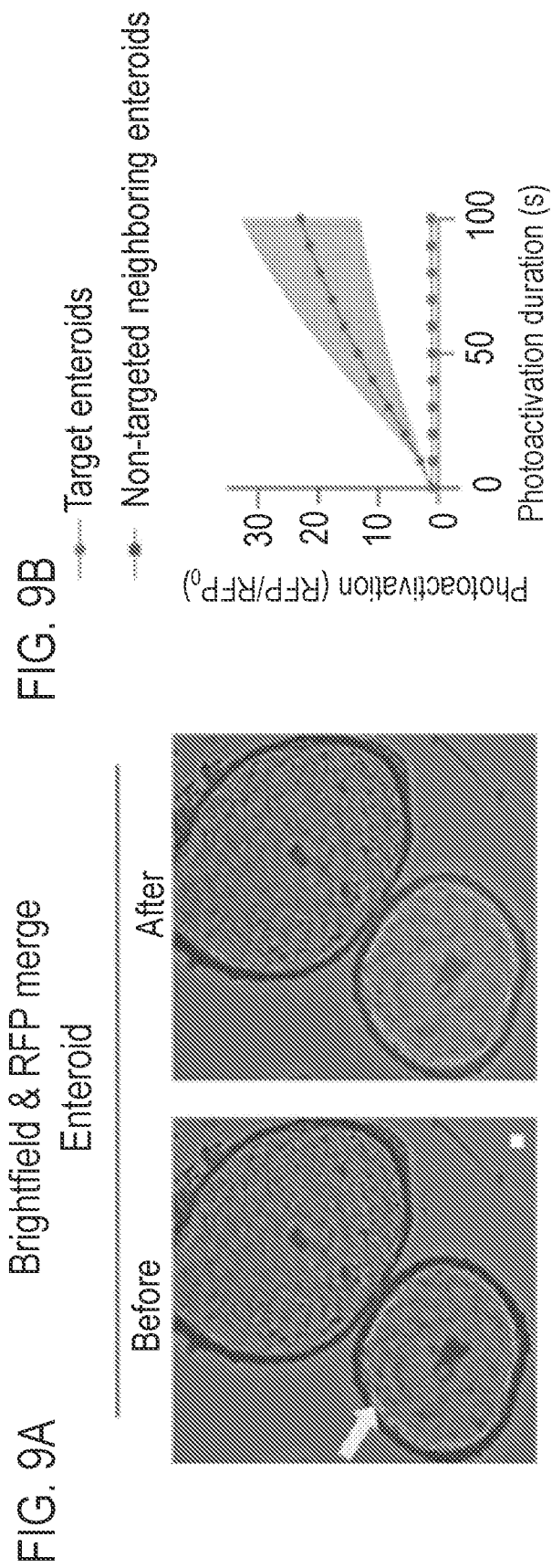
FIGS. 9A-9B are an image and a chart, respectively, showing the selective tagging of a single human intestinal enteroid using a photoactivatable dye and a digital mirror device.

FIG. 9A shows human intestinal enteroids (HIEs) that were stained with PA-JF549, a red dark-to-bright photoactivation dye before photoactivation and after photoactivation. A target enteroid (indicated by arrow) was selectively illuminated with by violet light using a DMD. The DMD patterned the photoactivation light to illuminate a region approximately the same size as an enteroid (90,000 µm$^2$). Only the target enteroid exhibited the red fluorescence associated with photoactivated PA-JF549. FIG. 9B shows a comparison of the mean photoactivation contrast ratio of target enteroids to that of non-illuminated neighboring enteroids. Optical tagging with DMD to the target cells, with negligible activation of neighboring enteroids ($p \leq 0.0001$, unpaired two-tailed t-test comparing the areas under the curves). The shaded regions represent the s.e.m., n=8 cells/group.

Example 8. Configuring the FACS Gate

FIG. 10A illustrates the calibration of the FACS gate to yeast cells with two controls, a negative and a positive control. The negative control (no photoactivation) is a sample that contained no tagged cells while the positive control (1 field-of-view photoactivation) corresponded to a sample that contained hundreds of tagged cells. The two controls were compared and the cell gate was determined by selecting the region that had cells present only in the positive control. The ratio in blue indicates the number of cells inside the gate over the total number of cells analyzed. FIG. 10B shows the application of the cell gate established during the calibration to the sorting of a sample containing a large number of cells. The ratio in blue indicates the number of cells inside the cell gate over the total number of cells analyzed. In this instance, the cell sorter read 6 million cells and detected 30 out of the 45 cells that were optically tagged.

Example 9. Detection and Retrieval of Photoactivated Single Cells with FACS

Figure 11B:
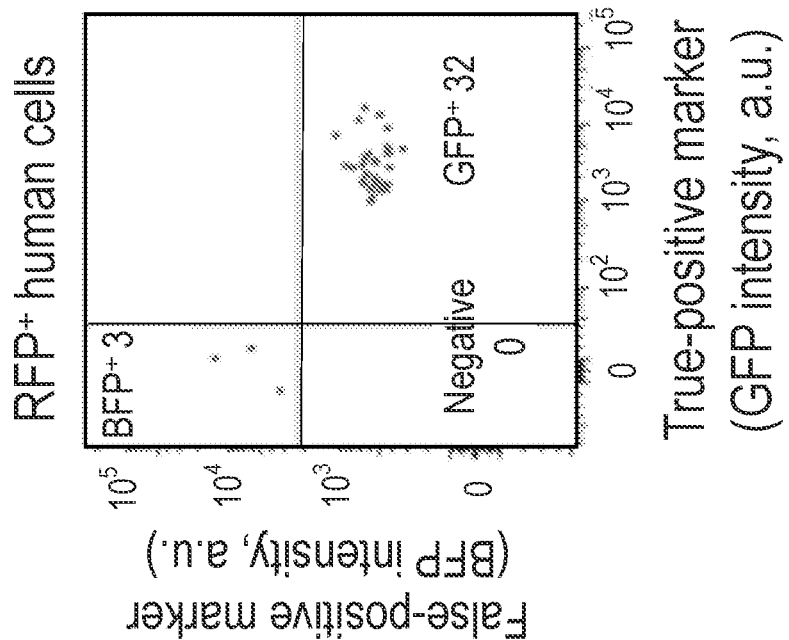
FIGS. 11A-11B are charts showing the application of the FACS photoactivated cell gate to sort a sample containing human cells tagged with photoactivated fluorescent proteins.
Figure 11A:
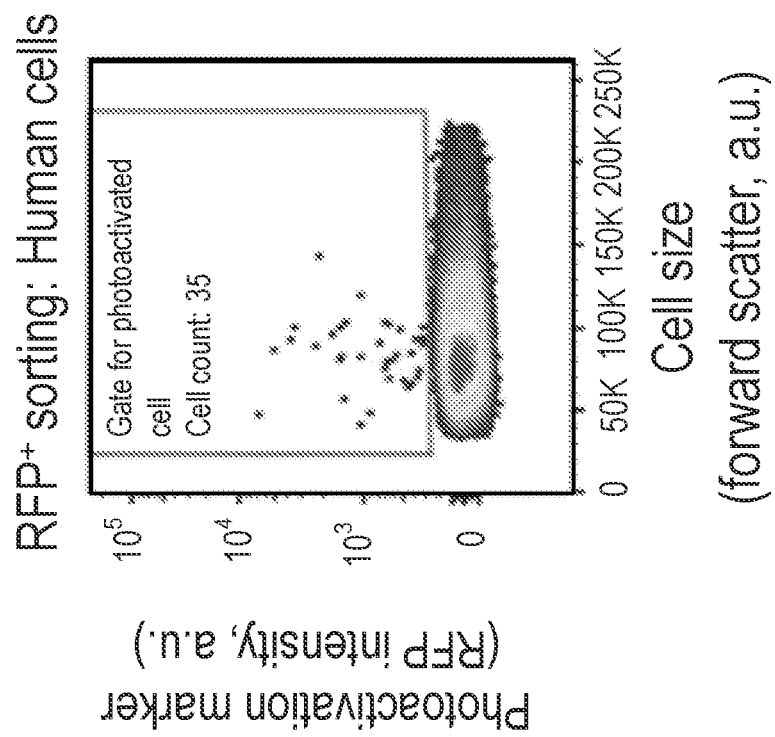

Human cells expressing EGFP and PAmCherry (GFP$^+$ cells) were diluted 20-fold with cells expressing TagBFP and PAmCherry1 (BFP$^+$ cells). In this experiment, 56 GFP$^+$ cells were photoactivated. FIG. 11A shows the application of the FACS RFP$^+$ sorting gate for photoactivated cells, which detected 35 cells. FIG. 11B plots BFP intensity against the GFP intensity for each of those cells. Of the 35 detected cells, 32 (~91%) were true positives while 3 were false positives.

Figures 12A, 12B:
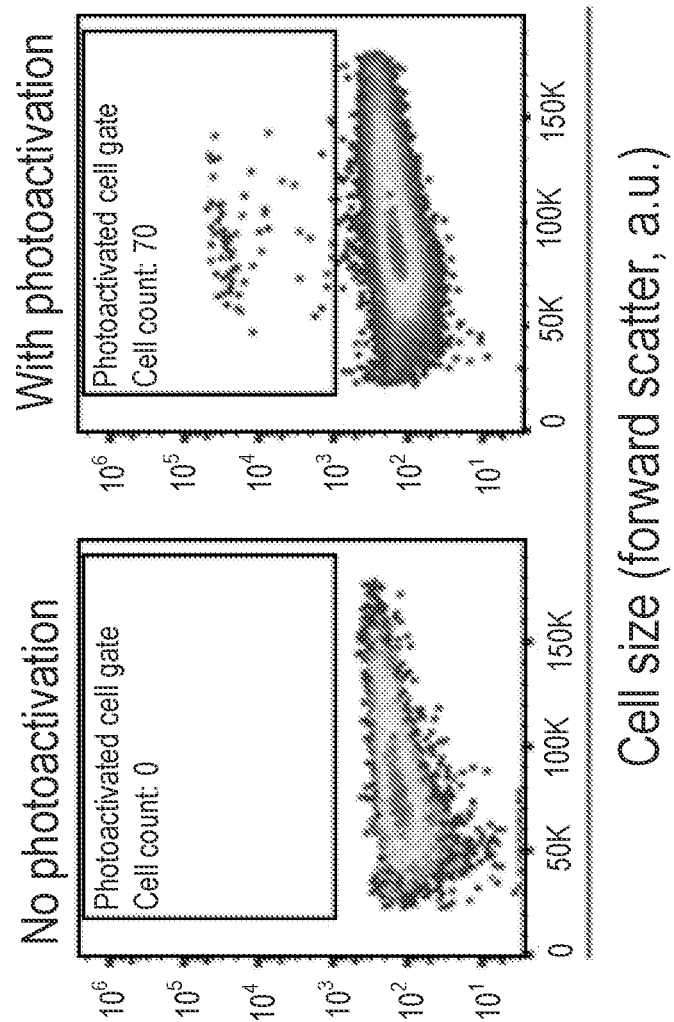
FIGS. 12A-12B are charts showing the application of the FACS photoactivated cell gate to sort a sample containing human cells stained with a photoactivated dye.

Human cells stained with the photoactivatable dye PA-JF549 can be selectively tagged and retrieved by FACS. In this experiment, 112 out of ~70,000 cells were individually photoactivated for 1 min. FIG. 12A shows the application of the FACS sorting gate for photoactivated cells against a negative control (no photoactivation). FIG. 12B shows the application of the FACS sorting gate to the entire sample of human cells. The FACS was able to detect and sort 70 (~63%) of the photoactivated human cells in the sample.

Figure 13A:
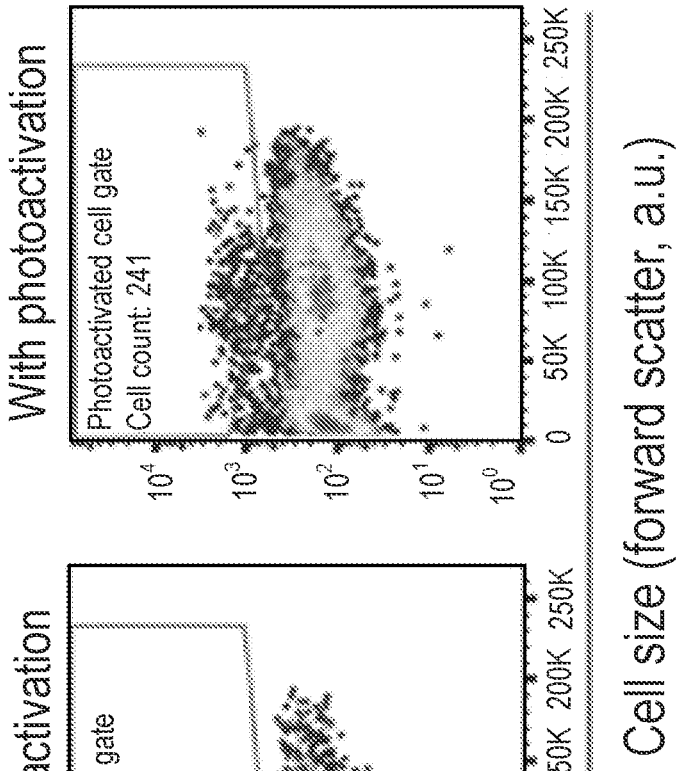
FIGS. 13A-13B are charts showing the application of the FACS photoactivated cell gate to sort a sample containing enteroid-derived cells stained with a photoactivated dye.
Figure 13B:
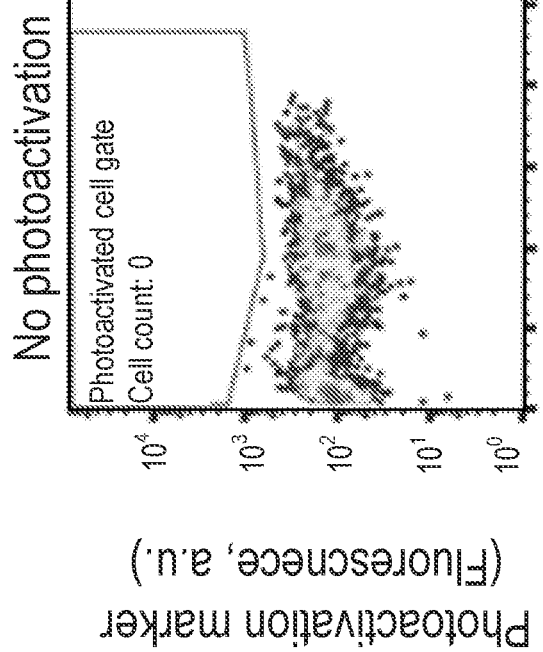

Whole enteroids stained with the photoactivatable dye PA-JF549 can be selectively tagged and their cells recovered by FACS. In this experiment, 9 out of 300 enteroids were individually photoactivated for 1 min, pooled, and dissociated. FIG. 13A shows the application of the FACS sorting gate for photoactivated cells against a negative control (no photoactivation). FIG. 13B shows the application of the FACS sorting gate to the entire sample of cells. The FACS was able to detect and recover 241 of the photoactivated enteroid cells in the sample.

Figure 14A:
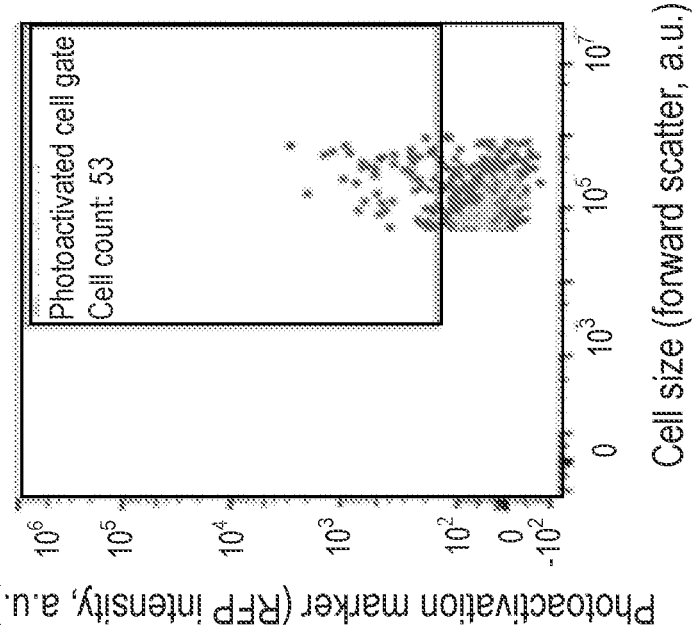
FIGS. 14A-14B are charts showing the application of the FACS photoactivated cell gate to sort a sample containing bacterial cells tagged with photoactivated fluorescent proteins.
Figure 14B:
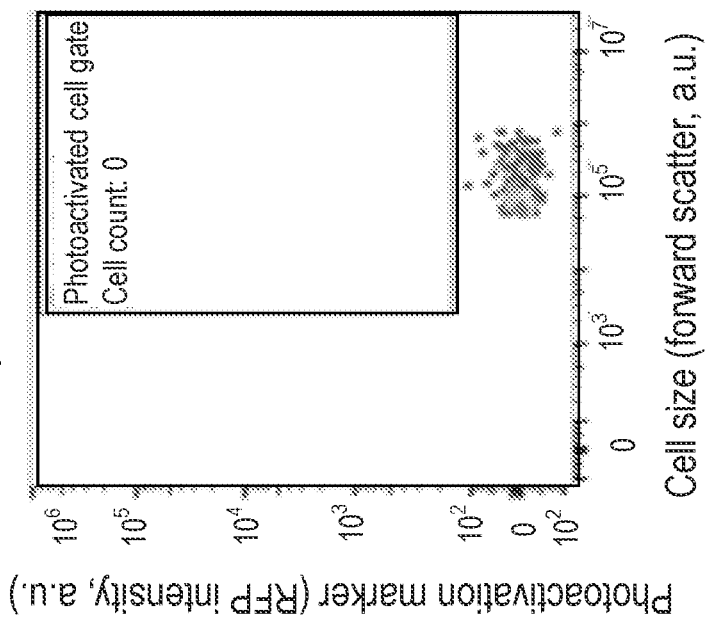

Bacterial cells transformed with a PAmCherry expression plasmid can be selectively tagged and retrieved by FACS. In this experiment, 60 cells were individually photoactivated for 1 min. FIG. 14A shows the application of the FACS sorting gate for photoactivated cells against a negative control (no photoactivation). FIG. 14B shows the application of the FACS sorting gate to the entire population of bacterial cells. The FACS was able to detect and sort 53 (~88%) of the photoactivated bacterial cells in the sample.

Although the present disclosure and its advantages have been described in detail, it should be understood that various changes, substitutions and alterations can be made herein without departing from the spirit and scope of the design as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method for screening cellular, subcellular, or multicellular structures, comprising the steps of:
   a) introducing a plurality of cellular, subcellular, or multicellular structures, or a combination thereof, to an imaging system, wherein one or more structures of the plurality comprise one or more taggable markers;
   b) imaging the plurality of structures using the imaging system;
   c) identifying one or more target structures among the plurality of structures based on one or more properties of the target structures;
   d) tagging the target structures to produce tagged target structures, wherein each target structure is selectively illuminated by an excitation light, thereby causing one or more taggable markers within the target structure to be phototransformed to produce one or more phototransformed taggable markers within the target structure; and
   e) isolating one or more tagged target structures from the plurality of structures using the phototransformed taggable markers,
   wherein the one or more structures of the plurality further comprise one or more selectable markers;
   the one or more phototransformed taggable markers within the target structure cause the activation of one or more selectable markers within the target structure to produce one or more activated selectable markers;
   isolating the one or more tagged target structures is performed by culturing the plurality of structures in an environment only amenable to structures comprising the one or more activated selectable markers to produce one or more isolated tagged target structures.

2. The method of claim 1, wherein the isolation of the one or more tagged target structures is performed with a structure sorting system.

3. The method of claim 2, wherein the structure sorting system is a flow cytometer with sorting capability.

4. The method of claim 2, wherein the structure sorting system is a fluorescence-activated large particle sorter.

5. The method of claim 1, wherein the one or more selectable markers comprise an antibiotic resistance marker.

6. The method of claim 1, wherein the one or more selectable markers comprise an auxotrophic marker.

7. The methods of claim 1, wherein steps a)-d) are repeated one or more times prior to isolation in step e).

8. The method of claim 1, wherein the one or more taggable markers comprise a phototransformable protein.

9. The method of claim 8, wherein the phototransformable protein is a photoactivatable protein.

10. The method of claim 9, wherein the photoactivatable protein is selected from the group consisting of: PA-GFP, PA-sfGFP, PAmCherry1, PATagRFP, PAmKate, and Phamret.

11. The method of claim 8, wherein the phototransformable protein is a photoconvertable protein.

12. The method of claim 11, wherein the photoconvertable protein is selected from the group consisting of: Kaede, Dendra2, mClavGR2, mMaple, PS-CFP2, Meos3.2, EosFP, mEosFP, mEos2, mEos3.2, mEos4a, mEos4b, tdEos, kikGR, PsmOrange, PsmOrange2, and mKikGR.

13. The method of claim 8, wherein the phototransformable protein is a photoswitchable protein.

14. The method of claim 13, wherein the photoswitchable protein is selected from the group consisting of: mTFP0.7, PDM1-4, Dronpa, Dronpa-2, Dronpa-3, bsDronpa, Padron, Padron0.9, Mut2Q, rsFastLime, rsKame, Dreiklang, mGeosM, EYQ1, KFP1, rsCherry, rsCherryRev, rsTagRFP, mApple, asFP595, Kindling FP, rseGFP, and rseGFP2.

15. The method of claim 1, wherein the one or more taggable markers comprise a phototransformable dye.

16. The method of claim 15, wherein the phototransformable dye is a photoactivatable dye.

17. The method of claim 16, wherein the phototransformable dye is selected from the group consisting of: PA-JF549, PA-JF646, DCDHF-based dyes, and BODIPY-based dyes.

18. The method of claim 15, wherein the phototransformable dye is a photoconvertible dye.

19. The method of claim 18, wherein the photoconvertible dye is a DiR-based photoconvertible dye.

20. The method of claim 15, wherein the phototransformable dye is a photoswitchable dye.

21. The method of claim 20, wherein the photoswitchable dye is selected from the group consisting of: Atto 488, Cy3B, Alexa 647, Cy7, Alexa 750, and Si-Rhodamine dyes.

22. The method of claim 1, wherein the plurality of structures are prokaryotic or eukaryotic cells.

23. The method of claim 1, wherein the plurality of structures are from an animal, from a plant, from a fungus, from a protist, from a bacteria, from a yeast, or from a mixture thereof.

24. The method of claim 23, wherein the plurality of structures are from a mammal.

25. The method of claim 24, wherein the structures are from a human.

26. The method of claim 25, wherein the human is known to have a medical condition or is suspected of having a medical condition.

27. The method of claim 1, wherein one or more structures in the plurality comprise a vector.

28. The method of claim 27, wherein the vector comprises an expression construct that encodes a mutant of a wild type protein.

29. The method of claim 1, wherein the one or more properties of the target structures are selected from the group consisting of fluorescence, bioluminescence, morphology, size, granularity, localization, calcium concentration, voltage, and a combination thereof.

30. The method of claim 1, further comprising the step of:
e) analyzing the one or more isolated tagged target structures.

31. The method of claim 30, wherein the analyzing comprises analysis of one or more DNA or RNA sequences in the one or more isolated tagged target structures.

32. The method of claim 31, wherein one or more structures comprise a vector that comprises an expression construct that encodes a mutant of a wild type protein, and wherein at least part of the sequence of the mutant is determined.

33. The method of claim 1, further comprising the step of culturing the one or more isolated tagged target structures.

\* \* \* \* \*